United States Patent [19]

Smith et al.

[11] Patent Number: 5,314,998
[45] Date of Patent: May 24, 1994

[54] ORGANIC SOLVENT-SOLUBLE METAL-AZO AND METAL-AZOMETHINE DYES

[75] Inventors: Terrance P. Smith, Woodbury; David W. Macomber, St. Paul, both of Minn.

[73] Assignee: Minnesota Mining and Manufacturing Company, St. Paul, Minn.

[21] Appl. No.: 941,741

[22] Filed: Sep. 8, 1992

[51] Int. Cl.$^5$ .............................................. C09B 45/14
[52] U.S. Cl. ................................. 534/701; 534/710; 534/711; 534/713; 534/723
[58] Field of Search ............... 534/701, 710, 711, 713, 534/723

[56] References Cited

U.S. PATENT DOCUMENTS

| | | | |
|---|---|---|---|
| 3,756,814 | 9/1973 | Bedell | 96/3 |
| 3,898,086 | 8/1975 | Franer et al. | 96/28 |
| 4,123,429 | 10/1978 | Brouard et al. | 534/710 |
| 4,155,707 | 5/1979 | Franceschini et al. | 8/2.5 |
| 4,218,367 | 8/1982 | Brouard et al. | 534/724 X |
| 4,562,139 | 12/1985 | Reczek | 430/223 |
| 4,565,688 | 4/1986 | Nakamura et al. | 428/200 |
| 4,605,607 | 8/1986 | Nikles et al. | 430/17 |
| 4,664,670 | 5/1987 | Mehl et al. | 8/470 |
| 4,784,905 | 11/1988 | Suzuki et al. | 428/321.3 |
| 4,808,568 | 2/1989 | Gregory et al. | 503/227 |
| 5,084,435 | 1/1992 | Vanmaele et al. | 503/227 |
| 5,166,326 | 11/1992 | Smith et al. | 534/701 |
| 5,180,705 | 1/1993 | Smith et al. | 503/227 |

FOREIGN PATENT DOCUMENTS 60-2398 8/1985 Japan.

OTHER PUBLICATIONS

Gregory, P., *Chemistry of Britain*, 1989, 25, pp. 47–50.
Liss et al, *Chemical Abstracts*, vol. 68, No. 31040w (1968).
Mahapatra et al, *Inorganic Chemistry*, 1986, 25, 2214–2221.

*Primary Examiner*—Mary C. Lee
*Assistant Examiner*—Fiona T. Powers
*Attorney, Agent, or Firm*—Gary L. Griswold; Walter N. Kirn; Gregory A. Evearitt

[57] ABSTRACT

Metal-azo dyes with excellent solubility in organic media are provided. The metal-containing dyes of the present invention have a nucleus of the formula:

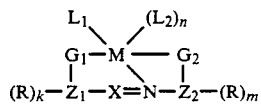

wherein the substituents have the meaning given in the description.

Dye-donor sheets comprising the abovementioned dyes are also disclosed.

11 Claims, 4 Drawing Sheets

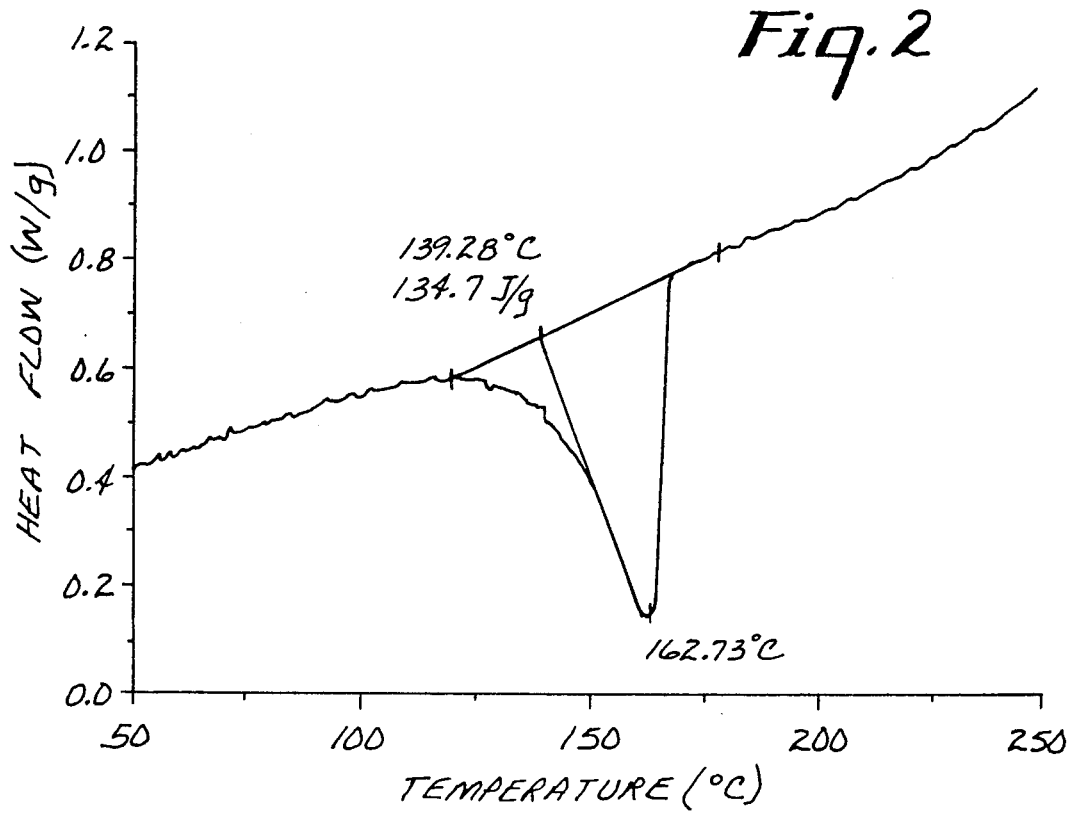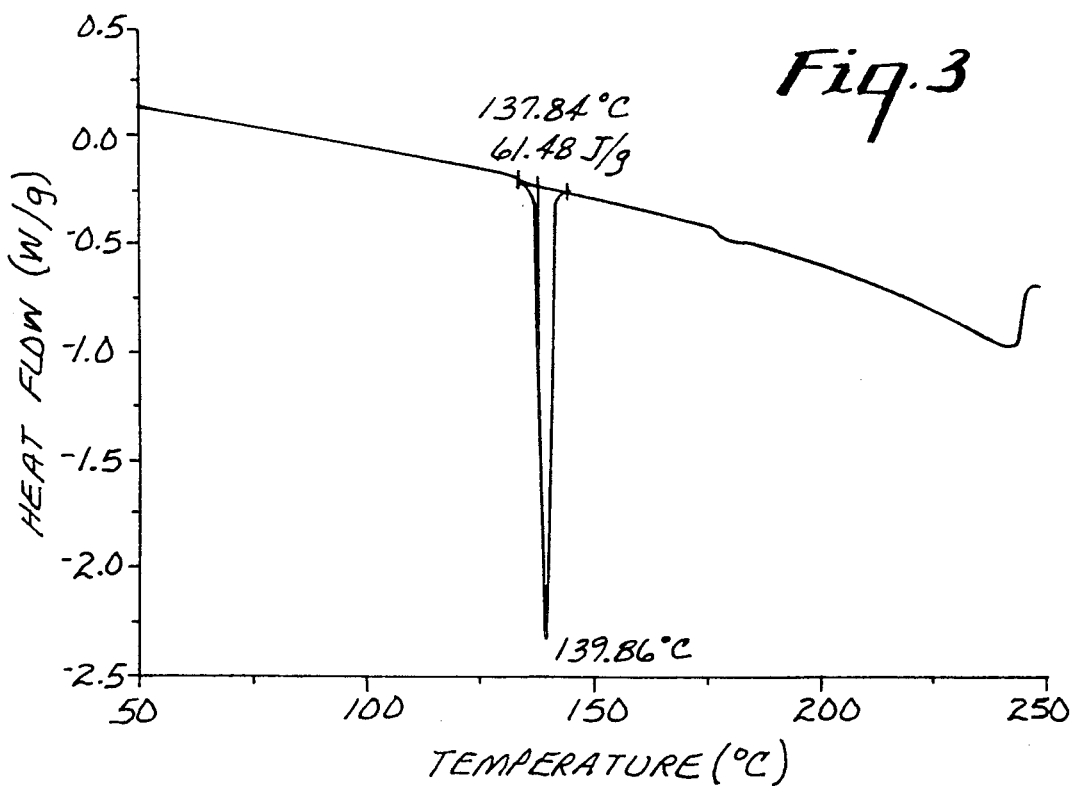

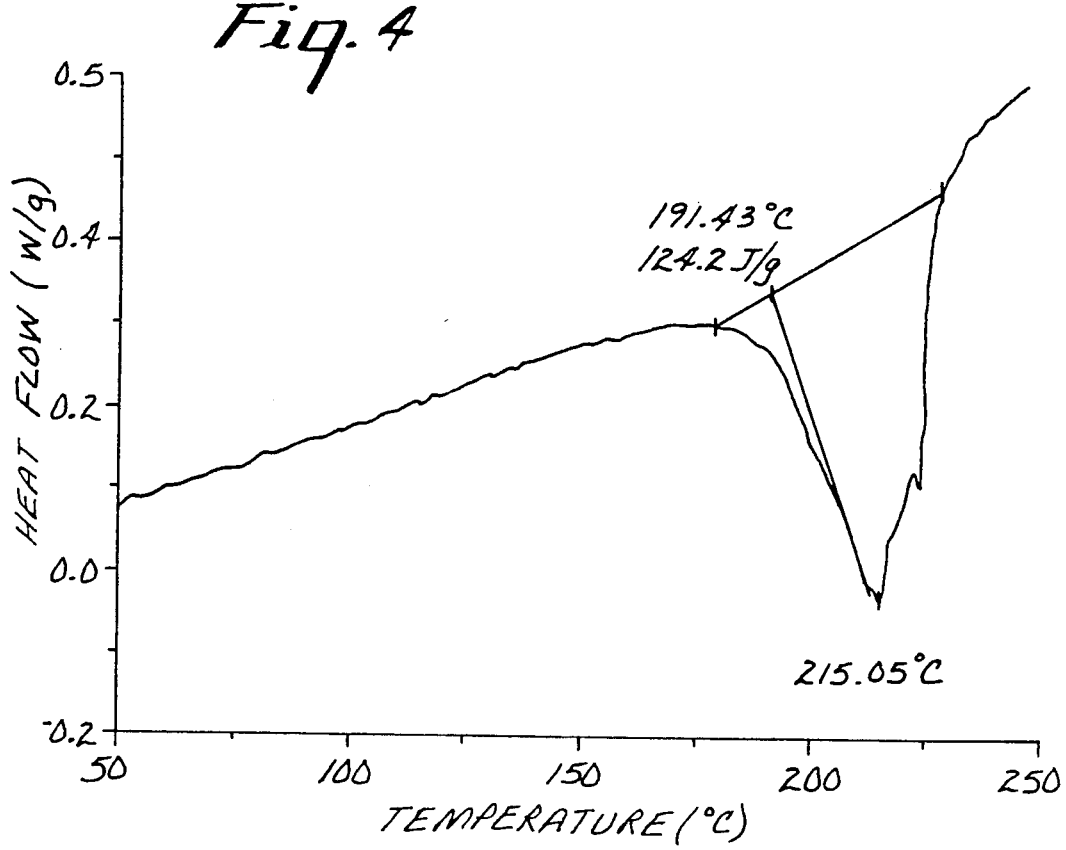
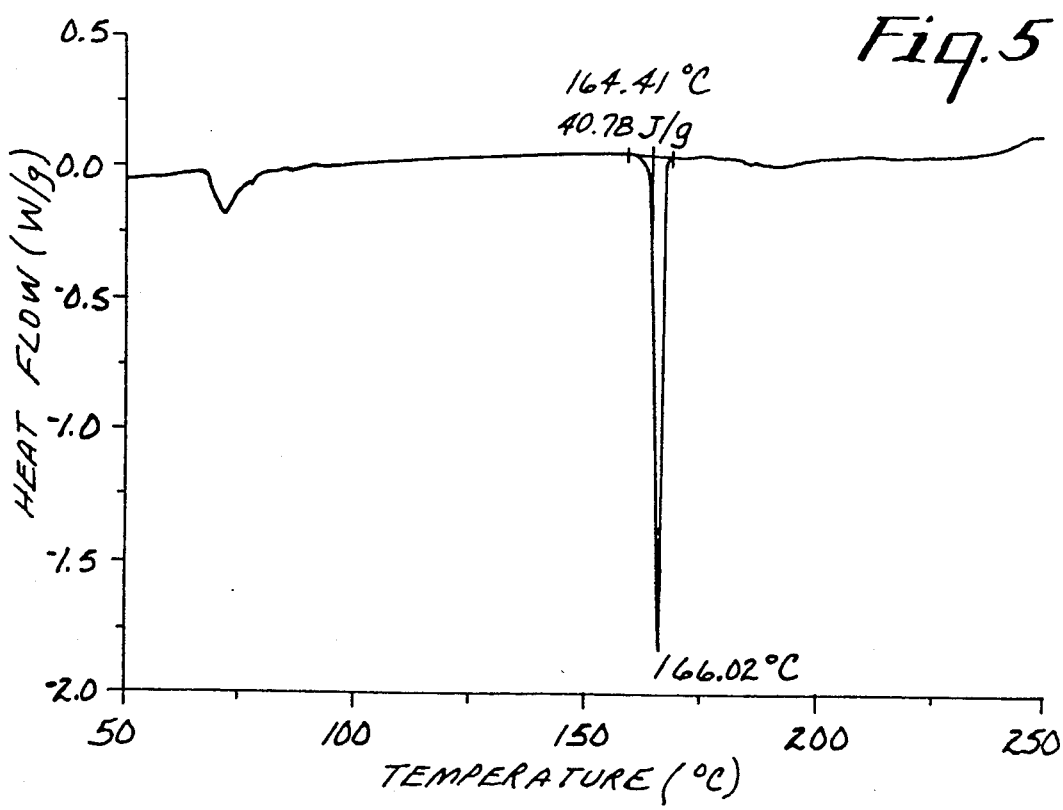

ORGANIC SOLVENT-SOLUBLE METAL-AZO AND METAL-AZOMETHINE DYES

FIELD OF THE INVENTION

This invention relates to metal complex dyes and more particularly it relates to transition metal complex dyes having ligands with organic solvent-solubilizing groups.

BACKGROUND OF THE INVENTION

Metal-azo and metal-azomethine dyes, having a single dye ligand complexed to a metal, are known in the art (see, for example, Drew, H. D. K.; Fairbairn, R. E. *J. Chem. Soc.* 1939, 823–35; Beech, W. F.; Drew, H. D. K. *J. Chem. Soc.* 1940, 608–12; Steiner, E.; Mayer, C.; Schetty, G. *Helv. Chem. Acta* 1976, 59, 364–76; U.S. Pat. Nos. 4,012,369; 4,123,429; and 4,265,811). These 1:1 complexes are predominantly used in two applications; color photography (e.g., see U.S. Pat. Nos. 3,453,107; 3,551,406; 3,544,545; 3,563,739; 3,597,200; 3,705,184; 3,752,836; 3,970,616; 4,150,018; and 4,562,139), and the dyeing of textiles (e.g., see U.S. Pat. Nos. 3,878,158; 4,045,423; 4,218,367; and 4,617,382; and European Pat. No. 144776). The 1:1 complexes have a central metal ion coordinated to a dye and additional ligands (e.g., water, pyridine, ammonia, or ethanolamine).

In cases where the additional ligand is an inorganic species (e.g., water or ammonia), the physical properties are much like other coordination complexes in that they possess high melting points and poor solubility in organic media. Even when the additional ligand is a small organic molecule, such as pyridine, the physical properties of the resulting metal-azo dye complex are often not like most organic substances. A typical example is [2,2-azobis[phenolato](-2)-N,O,O,](pyridine)copper which is reported to decompose at 310° C., apparently without melting. Reinvestigation of this compound using thermogravimetric analysis shows that the pyridine is in fact lost in the 100°–160° C. region.

Aside from the very early work of Drew et. al., melting point information is very sparse. In the Colour Index, the only melting point information on identifiable metal-azo dyes is on acid-basic complexes which generally consist of an anionic metal-azo complex and a positively charged organic dye. There have been several papers where melting temperatures are given for the unmetallized dye, but no information is given for the corresponding metal complexes.

There are also 1:1 metal-azo complexes containing 2- and 6-substituted pyridines, which form polydentate chelates that have been disclosed. For example, U.S. Pat. No. 4,562,139 discloses metal-azo dye complexes containing tridentate nitrogen-containing heterocycles. These materials are used in various photographic constructions and were designed to be compatible with gelatin. In the examples, the materials were coated from either aqueous or methanolic media and it is unlikely that they would be oil soluble dyes.

A survey of all the solvent dyes identified as either metal-azo or acid-basic dye complexes in the Third Edition, and subsequent supplements, of the Colour Index reveals that very few metal-azo dyes possess significant solubility in hydrocarbon media. Of the 152 dyes identified as metal-azo dyes or acid-basic dye complexes, only sixty-six had any solubility data for hydrocarbon solvents (turpentine, white spirits and mineral oil); sixty are listed as insoluble to very slightly soluble; five are listed as slightly soluble to soluble; and only one entry is listed as very soluble.

In allowed copending U.S. application Ser. No. 7/667,658, filed Mar. 11, 1991, metal-azo dyes containing pyridines containing free-radically polymerizable groups are disclosed. In addition to demonstrating that these materials could undergo free-radical polymerization reactions under standard conditions, it was found that in some instances, those materials also had good solubility in organic solvents.

One use of organic soluble metal-azo dyes is in thermal transfer printing. The term thermal printing covers two main technology areas. In thermal transfer printing of textiles, a donor sheet is coated with a pattern of one or more dyes; contacted with the fabric to be printed; and heat is uniformly administered, sometimes with concomitant application of a vacuum. The transfer process has been much studied, and it is generally accepted that the dyes are transferred by sublimation in the vapor phase. Pertinent references include: Bent, C. J. *J. Soc. Dyers Colour.* 1969, 85, 606; Griffiths, J.; Jones, F. Ibid. 1977, 93, 176; Aihara J. *Am. Dyest. Rep.* 1975, 64, 46; Vellins, C. E. In *The Chemistry of Synthetic Dyes*; Venkataraman, K., Ed.; Academic Press: New York, 1978; Vol. 8, p. 191.

The other area of thermal printing is thermal imaging, where heat is applied in an image-wise fashion to a donor sheet in contact with a suitable receptor sheet to form a colored image on the receptor. In one embodiment, termed thermal mass transfer printing, as described for instance in U.S. Pat. No. 3,898,086, the donor is a colorant dispersed in a wax-containing coating. Upon the application of heat, the construction melts or is softened and a portion of the colored donor coating transfers to the receptor. Despite problems with transparency, pigments are generally the colorants of choice in order to provide sufficient light fastness of the colored image on the receptor.

Another means of thermal imaging is termed variously thermal transfer imaging or recording, or dye diffusion thermal transfer. In this case, the donor sheet comprises a dye in a binder. On image-wise application of heat, the dye, but not the binder, is transferred to the receptor sheet. A recent review has described the transfer mechanism as a "melt state" diffusion process quite distinct from the sublimation attending textile printing (Gregory, P. *Chem. Brit.* 1989, 25, 47). This same review emphasizes the great difficulty of developing dyes suitable for diffusive thermal transfer. With regard to the available conventional dyes, it was stated that "... It is significant that of the one million or so dyes available in the world, none of them were fully satisfactory ..." Among the failings of these dyes are inadequate light and heat fastness of the image and insufficient solubility of the dyes for coating in the donor sheet. As has been noted previously, light fastness is also a problem in mass transfer imaging systems. In fact, achieving adequate light fastness is probably the single most important challenge in these constructions. In large measure this is the result of the diffusive thermal transfer dye image being a surface coating a few microns thick. The dye is thus readily susceptible to degradation by photo-oxidation. In contrast, textile fibers, which are 100 times thicker, are uniformly dyed throughout their depth, so that fade in the first few microns at the surface is of little practical importance. In consequence, it is common to find that dyes showing good light fastness in textile printing exhibit very poor photostability in the diffusive thermal imaging (see, for example, U.S. Pat. No. 4,808,568). There remains, therefore, a strong need for improved dyes for this latter application.

There is very little known about the use of metal-azo dyes in thermal printing art. A review on transfer printing (Datye, K. V.; Vaidya, A. A. *Chemical Processing of Synthetic Fibers and Blends*; John Wiley & Sons: 1984, p. 407) states: "Acid and metal-complex dyes which are commonly used for dyeing nylon are unsuitable for heat-transfer printing because these dyes have high melting points and low vapor pressures and hence, do not get vaporized and transferred below 200° C. However, the recently developed Dew Print TM machine enables wet-transfer printing of the acid and metal-complex dyes on nylon." The wet-transfer-process dyes of the above article require the presence of water solubilizing groups such as sulfo and carboxy, and the dyes are generally charged. This process involves the dissolution of the dye in water and transfer to the substrate. Further details of this process are given in U.S. Pat. No. 4,155,707.

Metal-azo dyes have been used in mass transfer printing. In Japanese Kokai Patent Application No. 62-021594, it is stated that "the ink layer is completely transferred to plain paper when the transfer recorder is peeled from plain paper"— an indication that both the binder and the colorant are transferred. Moreover, the binders used in the practical examples are all low molecular weight (less than 2000 Daltons), except for the control which was demonstrated to not transfer efficiently. The colorants used were high melting pigments, some of which were calcium or sodium salts of azo dyes. These salts are ionic in nature and are generally not soluble in organic solvents. In a related case, Japanese Kokai No. 62-021593, the process being discussed is also mass transfer, however, the colorants were "oil soluble". Some of these oil soluble dyes were metal-azo dyes wherein the structures were not explicitly disclosed. The metal-azo dyes that could be identified were found to be negative charged 2:1 (metal:azo) complexes. The solubility characteristics of the dyes, for which structures were not available, indicate that they are probably 2:1 complexes as well.

Other embodiments of mass transfer system utilizing metal-azo dyes are discussed in U.S. Pat. Nos. 4,585,688, 4,664,670, and 4,784,905. Described in U.S. Pat. No. 4,585,688 is a transfer medium comprised of a heat-resistive support, a colorant layer containing a binder and a coloring agent (which may be a metal-azo dye), and a transferable layer comprising a low molecular weight compound capable of containing a coloring agent and transferring an image to a paper receptor. In U.S. Pat No. 4,664,670, a thermal transfer donor construction requiring the presence of a low melting, essentially colorless, non-polymeric, organic nitrogen-containing, impregnating reagent for the printing of textiles is disclosed. A thermosensitive image transfer recording medium comprised of a support material and a thermofusible ink layer is described in U.S. Pat. No. 4,784,905. The thermofusible ink layer contains a fine porous resin structure made of a resin containing: (1) a coloring agent (which may be a metal-azo or metal-azomethine dye); and (2) a carrier material (for holding the coloring agent at normal temperatures and also for carrying the coloring agent out of the thermofusible ink layer for image formation upon application of heat), and (3) an image gradation control agent.

There are also several published patent applications (see, for example: Japanese Kokai Nos. 63-144084, 60-2398, and 59-78893) which disclose the use of metallizable azo dyes in thermal transfer donor constructions. In these cases, the donor layer comprises a binder and an azo dye that is capable of chelating to a metal. The azo dye is thermally transferred to a receptor layer which contains a metal salt which can react with the azo dye. The generation of a metal-azo dye by this method has several potential drawbacks because (1) the colors of the azo dyes and the metallized dye are different, the resultant color being dependent on the extent of metallization; (2) metallized dyes are generally much more resistant to light induced fade and therefore, if both azo dye and metallized-azo dye are present the color may change as a function of light exposure; and (3) the chelation of the azo dye to a metal often involves the generation of acid which could have a deleterious effect on image stability. This problem can be overcome by addition of buffering agents, however, this further complicates the donor or the receptor formulation.

The utility of some the materials of the present invention for thermal dye diffusion transfer is generally described in allowed co-pending U.S. application Ser. No. 7/667,323, filed Mar. 11, 1991. Aside from the work in this copending application, the foregoing art does not disclose or teach the preparation and use of oil-soluble metal-azo dye complexes having ancillary ligands, free of free-radically polymerizable groups that can be conveniently prepared.

SUMMARY OF THE INVENTION

The present invention provides metal-azo dyes with excellent solubility in organic media. The metal-containing dyes of the present invention have a nucleus of the following formula:

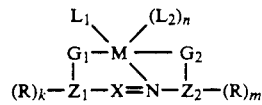

wherein:
- $Z_1$ and $Z_2$ each independently represent an arene nucleus, which has from 5 to 14 ring atoms;
- $G_1$ and $G_2$ each independently represent a metal ligating group, such that $G_1$ and $G_2$ may be contained within or pendant from at least one of $Z_1$ and $Z_2$;
- R represents a hydrogen atom, a halogen atom, an alkyl group, an acylamino group, an alkoxy group, a sulfonamido group, an aryl group, a thiol group, an alkylthio group, an arylthio group, an alkylamino group, an arylamino group, an amino group, an alkoxycarbonyl group, an acyloxy group, a nitro group, a cyano group, an alkylsulfonyl, an arylsulfonyl group, an alkylsulfoxyl group, an arylsulfoxyl group, an aryloxy group, a hydroxy group, a thioamido group, a carbamoyl group, a sulfamoyl group, a formyl group, an acyl group, a ureido group, an aryloxycarbonyl group, a silyl group, or a sulfoalkoxy group;
- $L_1$ represents a trialkyl or triaryl phosphine ligand; or $L_1$ represents a pyridine ring group free of free-radically polymerizable functionality and free of substitution at the 2-and 6-positions of the pyridine ring and at least one of the 3-, 4-, 5-positions of the pyridine ring are substituted with $R_1$, wherein;

$R_1$ represents an alkyl group, an acylamino group, an alkoxy group, a sulfonamido group, an aryl group, an alkylthio group, an alkylamino group, an alkoxycarbonyl group, an acyloxy group, an alkylsulfonyl group, an alkylsulfoxyl group, an alkylcarbamoyl group, an alkylsulfamoyl group, a formyl group, an acyl group, a silyl group, or a sulfoalkoxy group;

$L_2$ represents a non-free-radically polymerizable monodentate or polydentate (e.g. bidentate) ligand;

X represents nitrogen or a methine group;

M is a divalent or polyvalent transition metal ion where the coordination number is at least 4; and k, m, and n are whole numbers less than or equal to 3.

The metal-azo and metal-azomethine dyes of the present invention have a number of useful properties. To begin with, the inventive dyes have extinction coefficients generally greater than 1,000 $M^{-1}cm^{-1}$, often up to and exceeding 10,000 $M^{-1}cm^{-1}$, which makes them very useful for dyeing synthetic polymers and resins. Additionally, they are surprisingly thermally stable, many of them melting sharply at temperatures above 200° C. Furthermore, they have excellent solubility in organic media.

Other aspects and advantages of the present invention are apparent from the detailed description, examples, and claims.

BRIEF DESCRIPTION OF THE DRAWINGS

FIG. 2: Differential Scanning Calorimeter scan of compound 8.

FIG. 3: Differential Scanning Calorimeter scan of compound 9.

FIG. 4: Differential Scanning Calorimeter scan of compound 10.

FIG. 5: Differential Scanning Calorimeter scan of compound 11.

DETAILED DESCRIPTION OF THE INVENTION

Figure 1:
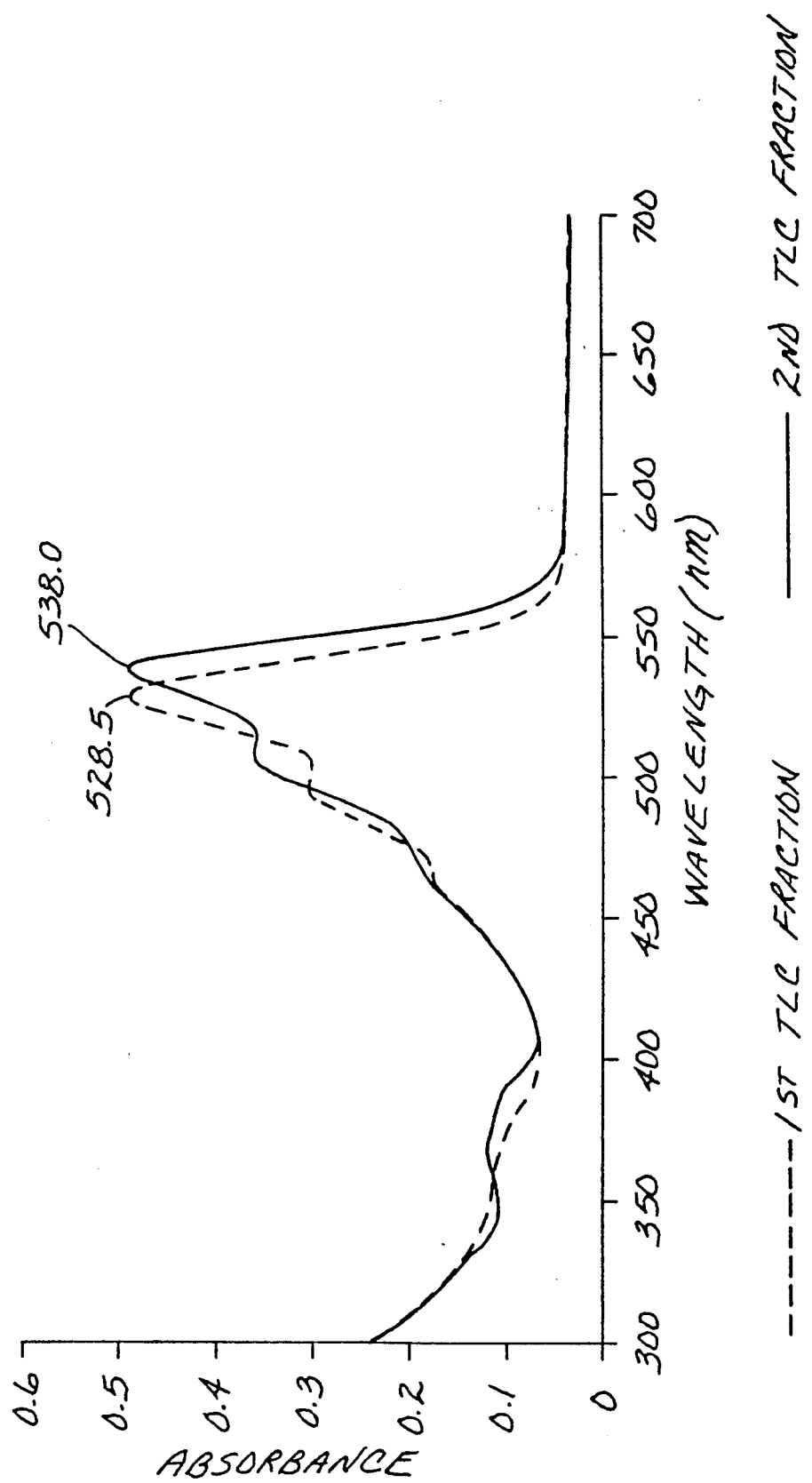
FIG. 1: Visible absorption spectra of isomers a and b of Example 40.

Organic soluble metal-azo dyes of the present invention may be represented by the following general structure:

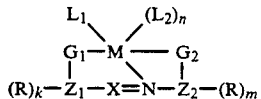

wherein:

$Z_1$ and $Z_2$ each independently represent an arene nucleus having from 5 to 14 ring atoms; for example $Z_1$ and $Z_2$ may represent a heterocyclic or substituted heterocyclic nucleus (e.g., pyrrole, pyrazole, furan, indole, thiophene, etc.) or a carbocyclic or substituted carbocyclic aromatic nucleus (e.g., benzene, naphthalene, toluene, etc.) As used herein, the term "arene nucleus" means a nucleus containing at least one aromatic ring, e.g. benzene or napthalene.

$G_1$ and $G_2$ each independently represent a metal ligating group (e.g., oxygen, sulfur, amines, substituted amines, acylamido, sulfonamido), such that $G_1$ and $G_2$ may be contained within or pendant from at least one of $Z_1$ and $Z_2$.

R represents a hydrogen atom, a halogen atom, an alkyl group (e.g., a methyl group, ethyl group, hexyl group, etc.), an acylamino group (e.g., an acetamido group, benzamido group, hexanamido group, etc.), an alkoxy group (e.g., a methoxy group, ethoxy group, benzyloxy group, etc.), a sulfonamido group (e.g., a methanesulfonamido group, benzensulfonamido group, etc.), an aryl group (e.g., a phenyl group, a 4-chlorophenyl group, etc.), a thiol group, an alkylthio group (e.g., a methylthio, a butylthio group, etc.), an arylthio group (e.g., a phenylthio group, a 4-methoxyphenylthio group, etc.), an alkylamino group (e.g., a cyclohexylamino group, methylamino group, etc.), an arylamino group (e.g., an anilino group, a 4-methoxyphenylamino group, a naphthylamino group, etc.), an amino group, an alkoxycarbonyl group (e.g., a methoxycarbonyl group, a butoxycarbonyl group, etc.), an acyloxy group (e.g., an acetoxy group, a butyryloxy group, a benzoyloxy group, etc.), a nitro group, a cyano group, an alkyl or aryl sulfonyl group (e.g., a butanesulfonyl group, a benzenesulfonyl group, etc.), an alkyl or aryl sulfoxyl group (e.g., a butanesulfoxyl group, a benzenesulfoxyl group, etc.), an aryloxy group (e.g., a phenoxy group, a naphthyloxy group, etc.), a hydroxy group, a thioamido group (e.g., a butanethioamido group, a benzenethiocarbamoylamido group, etc.), a carbamoyl group (e.g., a carbamoyl group, an N-arylcarbamoyl group, an N-alkylcarbamoyl group, etc.), a sulfamoyl group, an N-arylsulfamoyl group, etc.), a formyl group, an acyl group (e.g., an acetyl group, a hexanoyl group, a benzoyl group, etc.), an ureido group (e.g., an N-ethylureido group, etc.), an aryloxycarbonyl group (e.g., a phenoxycarbonyl group, a 4-methoxyphenyloxycarbonyl group, etc.), a silyl group (e.g., a trimethylsilyl group, a phenyldimethylsilyl group, etc.), a carbonato group (e.g., a methylcarbonato group, a phenylcarbonato group, etc.), or a sulfoalkoxy group (e.g., a sulfomethoxy group, etc.)

$L_1$ represents a trialkyl- or triaryl-phosphine ligand; or $L_1$ represents a pyridine ring group free of free-radically polymerizable functionality, and free of substitution at the 2- and 6-positions on the pyridine ring and at least one of the 3-, 4-, 5-positions are substituted with $R_1$. In the case of $L_1$ being a pyridine ligand, $L_1$ is bonded to M through the pyridine nitrogen. (Free-radically polymerizable groups are well known in the art and include, but are not limited to, 2° or 3° alkenyl including conjugated alkadienyl groups, preferably 2° or 3° alkenyl or conjugated alkadienyl groups having from 3 to 12 carbon atoms, e.g., a 2-methylpentenyl group, an isoprenyl group, a 2-methylhexenyl group, etc., or halogen substituted 1° alkenyl groups having from 2 to 14 carbon atoms wherein the halogen is bonded directly to the carbon-carbon double bond, e.g., a chlorethenyl group, a chlorphenyl group, etc.; styryl groups including p-substituted styryl groups, preferably having from 8 to 20 carbon atoms, e.g., a p-methoxystyryl group, a p-dodecylstyryl group, etc.; vinyl ester groups, preferably having from 4 to 16 carbon atoms, e.g., $-CH_2CO_2CH=CH_2$, $CH_3CH_2CO_2CH=CH-$, etc.;

vinyl ether groups, preferably having from 3 to 15 carbon atoms, e.g., an ethenyloxymethyl group, an isopropenyloxyethyl group, etc.; an acrylate group; a methacrylate group; a cyanoethenyl group; a cyanoisopropenyl group; an acrylamido group, and a methacrylamido group). Preferably, $L_1$ is a pyridine group wherein the 2-position and the 6-position are hydrogen, and at least one of the 3-position, 4-position, or 5-position are substituted with either an alkyl group, an ester group, an alkanoyl group, an alkylsulfonyl group, or an alkoxy group. Examples of $L_1$ (phosphines) include, but are not limited to, trimethylphoshine, tri-n-butylphosphine, tricyclohexylphosphine, dimethylphenylphosphine, methyldiphenylphosphine, or triphenylphosphine. Examples of $L_1$ (pyridines) include, but are not limited to, 4-octylpyridine, 4-(5-nonyl)pyridine, 4-(3-pentyl)pyridine, ethyl nicotinate, etc.

$R_1$ represents an alkyl group, an acylamino group, an alkoxy group, a sulfonamido group, an aryl group, an alkylthio group, an alkylamino group, an alkoxycarbonyl group, an acyloxy group, an alkylsulfonyl group, an alkylsulfoxyl group, an alkylcarbamoyl group, an alkylsulfamoyl group, a formyl group, an acyl group, a silyl group, or a sulfoalkoxy group. Preferably, $R_1$ should not contain hydrophilic groups such as $-SO_3-$, $-SO_3H$, $-CO_2-$, or $-CO_2H$ as these groups tend to reduce solubility in organic solvents.

$L_2$ represents a non-free-radically polymerizable monodentate or polydentate (e.g. bidentate) ligand. Suitable monodentate ligands include water; ammonia; halides (e.g., fluorine, chlorine, etc.); thiocyanate; cyanide($-1$); azide($-1$); carbon monoxide; alkyl and aryl isocyanides (e.g., methylisocyanide, phenylisocyanide, etc.); alkyl and aryl nitriles (e.g., acetonitrile, benzonitrile, etc.); phosphines $P(R_2)_3$, amines $N(R_2)_3$, arsines $As(R_2)_3$, sulfides $R_2SR_2$ (wherein each $R_2$ independently represents an alkyl or aryl group); heteroarenes (e.g., pyridine, quinoline, etc.); nitrate($-1$); and sulfate($-2$). Suitable bidentate ligands include alkylene and arylenediamines (e.g., ethylenediamine, 1,2-benzenediamine, tetramethylethylenediamine; etc.); polycyclic arenes with two or more aromatic nitrogen atoms (e.g., bipyridyl; 1,10-phenanthroline; etc.); oxalate($-2$); alkyldiketonates (e.g., acetylacetonate($-1$), etc.); N,N-dialkyldithiocarbamates($-1$); ethylenediamine; 8-hydroxyquinolate($-1$); and diarylgyloximates($-2$). For six-coordinate trivalent metal-azo complexes such as chromium, the preferred bidentate ligand is alkyldiketonate($-1$).

X represents nitrogen or a methine group.

M is any divalent or polyvalent transition metal ion where the coordination number is at least four. Preferred transition metal ions are Group 6 and Group 10 metal ions. Particularly preferred transition metal ions are chromium(III), nickel(II), palladium(II), and platinum(II). The ratio of metal-to-dye in the present invention is 1:1.

k, m and n are whole numbers less than or equal to 3.

The metal chelate may be formed with loss of a proton from a conjugate acid, thereby forming a conjugate base, or by sharing a pair of electrons with the metal. There may be employed, for example, amino, alkylthio, hydroxy, carboxy, sulfonamido, or sulfamoyl. In a preferred embodiment, $G_1$ and $G_2$ independently represent hydroxy, carboxy, or a nitrogen atom. In the case of nitrogen, the nitrogen can be contained as part of $Z_1$ and/or $Z_2$.

Additional substituents which may be attached to $Z_1$ and $Z_2$ include, but are not limited to, substituents such as alkyl, aryl, acyl, alkoxy, halogen such as fluorine or chlorine, cyano, nitro, thioalkyl, and solubilizing groups such as sulfonamido and sulfamoyl. Solubilizing groups are preferred so as to make the dye compatible with a given solvent system or polymer. Preferred solubilizing groups for organic coatings are alkylsulfonamides. Preferably, carboxy and sulfo substituents are not present since they detract from the advantages obtained by attaching a long organic-solubilizing group on the pyridine.

Where the terms "group" or "nucleus" are used in describing substituents, substitution is anticipated on the substituent. For example, "alkyl group" includes ether groups (e.g., $CH_3-CH_2-CH_2-O-CH_2-$), haloalkyls, nitroalkyls, carboxyalkyls, hydroxyalkyls, etc. Similarly, the term "arene nucleus" refers, for example, to not only phenyl, but to chlorophenyl, ethylphenyl, and naphthyl as well. Substituents which react with active ingredients, such as very strong reducing or oxidizing substituents would, of course, be excluded as not being inert or harmless.

The dyes of the present invention are useful in the preparation of dye donor elements which, when heated in an image-wise fashion, result in the image-wise transfer of dye to a receptor sheet that is placed in intimate contact with the dye donor element. The resulting dye images have good light and heat fastness.

Dye donor elements encompass a variety of structures, including self-supporting films and laminated films on various substrates. Dye donor elements are useful for thermal transfer imaging by means such as a thermal print head or a laser (including solid state laser diode lasers and arrays thereof). In cases where laser imaging is anticipated, an additional dye capable of absorbing the incident laser radiation (e.g., an infrared dye for use with semiconductor laser diodes) may optionally be added to the donor layer.

Dye donor elements provide transferred images which generally have good heat and light fastness.

The process of dye diffusion transfer consists of contacting a dye donor sheet with a suitable receptor sheet and thereafter, applying heat in an image-wise fashion to transfer the dye to the receptor. Preferably, the transfer involves temperatures in the range of 100° to 400° C.; contact pressures in the range of 5 to 50 psi; and times from about 1 to 10 milliseconds for heating with a resistive heating element. Alternatively, if laser heating is employed in place of contact with a resistive heating element, then contact pressures of from greater than 0 to 50 psi and dwell times of from 0.1 microsecond to 1 millisecond may be successfully employed.

In addition to providing an image of acceptable density and of correct color, the dye must provide good light fastness and heat stability in the image. It is particularly desirable that the dye transfers in proportion to the energy supplied so that a good gray scale of coloration can be achieved. Dye donor sheets suitable for dye diffusion transfer comprise a dye ink coated on a suitable substrate, though a self-sustaining dye film is also a possibility. The carrier sheet is preferably flexible, but may be rigid if the receptor layer is sufficiently flexible and/or conformable. The substrates may thus be glass, ceramic, metal, metal oxide, fibrous materials, paper, polymers, resins, and mixtures of these materials. For the backside thermal exposure with a thermal print head, examples of suitable substrates include polyester, polyamide, polyacrylate, polyalkylene and cellulosic films, and papers, especially the uniform high quality paper known as condenser paper. It may be desirable to apply a backside to the substrate on the side away from the dye to protect it from the heat source or to prevent sticking to the thermal element. The thickness of the resultant substrate may vary within wide limits depending on its thermal properties, but is generally less than 50 microns, and is preferably less than 10 microns. If a front thermal exposure is used, for instance when a laser irradiates the dye through a transparent receptor sheet, the substrate may be of arbitrary thickness.

The dye ink applied to the donor sheet comprises a metal-azo or metal-azomethine dye as defined above, and a suitable binder. Other additives such as plasticizers, stabilizers, or surfactants may also be present, as it known in the art. Suitable binders are polymeric materials such as: polyvinyl chloride and its chlorinated derivatives; polyesters; celluloses, such as cellulose acetate, cellulose acetate butyrate, ethyl-cellulose and the like; epoxy resins; acrylates, such as poly(methyl methacrylate); vinyl resins, such as poly(vinyl acetate), poly(vinyl butyral), poly(vinyl pyrrolidone) and poly(vinyl alcohol); polyurethanes; polysiloxanes; and copolymers, such as those derived from polyacrylates or polyalkylene materials; and blends or mixtures of these various polymers. The dye may be present in the binder in the dissolved state, or it may be dispersed with at least some crystalline dye present. In some cases as much as 99% by weight of the dye may be used, but more typically, the weight of dye is about 90% to 15% of the total ink layer. A preferred range is from 70% to 40% by weight of dye in the multilayer constructions. A self-supporting element may contain 20% by weight of the binder, and preferably as much as 40% by weight of the binder.

In general, it is desired to formulate the donor such that the dye, but substantially none of the donor element binder, is transferred to the receptor. However, in some cases valuable constructions can be prepared in which the dye along with a significant, or indeed major, portion of the binder is transferred in a mass transfer process. The receptor sheet may be transparent, translucent, or opaque. It may be a single layer or a laminate. Particularly useful constructions can be made when the receptor is applied to a transparent polyester film or to a paper substrate.

The receptor sheet may comprise a wide variety of polymers.

Suitable materials are similar to those disclosed above for the binder of the donor sheet. The receptor may additionally contain various additives, such as heat and light stabilizers or coating aids. While the exact nature of the receptor may influence the quality and the fastness of the image, it has been found that, for the most part, the good stability of the dyes of this invention is a property of the dye image itself, and not of the receptor composition.

Tautomerization between azo and hydrazone forms of dyes similar to those represented herein as azo dyes is well known. Consequently, the use of the azo and hydrazone tautomers in the application refers to all reasonable tautomers of the compound in question. When used to prepare metallized dyes, deprotonation renders the tautomers chemically identical.

The following non-limiting examples further illustrate the present invention.

EXAMPLES

Chemicals used in the examples are commercially available from companies listed in Chem Sources (Directories Publishing Company; Orlando Beach, Fla.) such as Aldrich Chemical Company (Milwaukee, Wis.) or Reilly Tar and Chemical (Indianapolis, Ind.) unless otherwise specified. 4-Nonanoylpyridine, 4-octylpyridine, and 4-nonylpyridine were prepared according to the procedures described in Prasad, K. B.; Al-Jallo, H. N.; Al-Dulaimi, K. S.; *J. Chem. Soc.* (C), 1969, 2134–2136. The remaining azo dyes were prepared by standard procedures described in Brady, P. R.; Cookson, P. G.; Fincher, K. W.; Lewis, D. M. *J. Soc. Dyers Colour.* 1982, 98, 398–403 unless otherwise specified. N,N-dibutyl-3-hydroxy-4-(5-hydroxy-3-methyl-1-phenyl-1H-pyrazol-4-yl)azo-1-naphthalenesulfonamide was prepared according to procedures described by Idelson, M.; Karady, I. R.; Mark, B. H.; Rickter, D. O.; Hooper, V. H. *Inorg. Chem.* 1967, 6, 450. N-Butyl-(3-phenylpropyl)amine was prepared in high yield by hydrogenation of a mixture of n-butylamine and hydrocinnamaldehyde according to the procedure of Shapiro, S. L.; Parino, R. A.; Freedman, J. *J. Am. Chem. Soc.* 1959, 81, 3733.

The metal-azo dye complexes were characterized by one or more of the following physical methods: UV-Visible spectroscopy, FT-IR spectroscopy, NMR spectroscopy, mass spectroscopy, laser desorption mass spectroscopy, elemental analysis, and gel permeation chromatography. Melting points of the metal complexes were determined using a Thomas-Hoover melting point apparatus or by differential scanning calorimetry at a heating rate of 5° C. per minute.

In the following examples, the particular dye synthesized is referred to by number (e.g., 1, 2, 3, etc.) and the corresponding structure for the numbered dyes are shown later herein.

EXAMPLE 1

This example describes the preparation of 1-(5-N,N-dibutylsulfonamido-2-hydroxyphenyl)azo-2-naphthol(1).

To a stirred solution of 160.6 ml sulfuryl chloride in 1000 ml chloroform in a round bottomed flask equipped with a dropping funnel, thermometer, and magnetic stirrer was added dropwise 139.4 ml triethylamine and 168.5 ml dibutylamine with cooling in an ice-water bath to maintain a temperature of 15°–20° C. After the addition was complete, the reaction mixture was stirred without cooling for an additional hour, then poured into a mixture of ice and water (2000 ml). The chloroform phase was separated and washed with 10% hydrochloric acid (1000 ml) followed by ice cold water. The solution was dried over anhydrous calcium chloride (4–20 mesh). Evaporation of the solvent gave 147.7 g N,N-dibutylsulfonamide as a colorless oil.

Anhydrous aluminum chloride (175.6 g) was added portionwise with stirring to 136.2 g dibutylsulfonamide and 83.4 g nitrophenol in 125 ml nitrobenzene with slight heating by an oil bath. The mixture was heated to 85°–90° C. for 4 hours. Progress of the reaction was monitored by thin layer chromatography. The reaction mixture was poured into 1 liter of ice-water and extracted into ether. The ether layer was separated, washed with water, and dried over anhydrous magnesium sulfate. Evaporation of the ether and vacuum distillation removal of the nitrobenzene gave 129.6 g N,N-dibutyl-3-nitro-4-hydroxysulfonamide (about 90% purity).

The entire amount of N,N-dibutyl-3-nitro-4-hydroxysulfonamide prepared above was placed in a round bottomed flask equipped with a magnetic stirrer, condenser, and a dropping funnel. Triethylamine (250 ml) and 12 g palladium on carbon catalyst (10%) were added. The mixture was heated to reflux and 150 ml formic acid was added dropwise over about 2 hours. After addition was complete, the mixture was stirred an additional 2 hours then poured into 1-liter of ice-water. The mixture was adjusted to a pH of 9–10 with 10% sodium hydroxide, and the organic layer was separated, washed with ice-water, and dried over anhydrous sodium carbonate to give to 89.7 g of N,N-dibutyl-3-amino-4-hydroxysulfonamide.

N,N-Dibutyl-3-amino-4-hydroxysulfonamide (6.0 g) and 2.88 g 2-naphthol were dissolved in 80 ml ethanol and added dropwise to a stirred solution of 1.54 g sodium nitrite in 200 ml ice-water and 60 ml hydrochloric acid. After stirring for about 30 minutes an oily layer began to separate. The water layer was decanted and the oily residue was dissolved in 200 ml chloroform and twice washed with cold water. After separation, the organic layer was dried over anhydrous calcium chloride and the solvent was evaporated to give 7.35 g of 1, which was purified by column chromatography on silica gel with ethyl acetate/toluene (1:4).

EXAMPLE 2

This example describes the preparation of 1-(5-N-butyl-N-propylphenylsulfonamido-2-hydroxyphenyl)azo-2-naphthol (2).

To stirred chlorosulfonic acid (5.32 ml) cooled in an ice-water bath was added dropwise 2-nitroanisole (2.80 g) while maintaining the temperature below 10° C. After addition was complete, the ice bath was removed and the mixture was stirred at room temperature for one hour. The dark red mixture was poured slowly into stirred ice-water, extracted into diethyl ether, washed three times with water, and dried over anhydrous magnesium sulfate. Following evaporation of the ether a brown oily residue was obtained. To a stirred mixture of 1.51 g of the brown oily residue and 5 ml pyridine was added 1.38 g N-butyl-(3-phenylpropyl)amine. The mixture was stirred for 30 hours, poured into water, and extracted into 100 ml chloroform. After washing with 6×100 ml portions of water, drying over anhydrous magnesium sulfate and removal of the chloroform, 1.95 g of a red oil was obtained which was purified by column chromatography on silica gel with 1:1 chloroform/hexane to give 1.12 g N-butyl-N-(3'-phenylpropyl)-4-methoxy-3-nitrobenzenesulfonamide.

To a stirred solution of 0.73 g N-butyl-N-(3'-phenylpropyl)-4-methoxy-3-nitrobenzensulfonamide in 10 ml dimethyl sulfoxide was added 10 ml of a 50% aqueous potassium hydroxide solution and the mixture was heated and stirred at 80° C. for 4 hours. The mixture was poured into water, acidified to pH 4-5 with 20% aqueous hydrochloric acid and extracted into chloroform. The extract was washed with water, dried over anhydrous magnesium sulfate, filtered, and the solvent was removed to give 0.71 g N-butyl-N-(3'-phenylpropyl)-4-hydroxy-3-nitrobenzenesulfonamide.

A mixture of 13.16 g N-butyl-N-(3'-phenylpropyl)-4-hydroxy-3-nitrobenzenesulfonamide, 2 g 1 wt % platinum on alumina, and 200 ml ethanol was stirred for 22 hours at room temperature in a bomb charged with 800 psi of hydrogen. The solution was filtered and concentrated to give 12.02 g N-butyl-N-(3'-phenylpropyl)-3-amino-4-hydroxybenzensulfonamide.

To a stirred solution of 7.41 g N-butyl-N-(3'-phenylpropyl)-3-amino-4-hydroxybenzenesulfonamide in 30 ml ethanol cooled in an ice-salt-water bath were added 5.6 ml of 37% aqueous hydrochloric acid and 20 g ice. The mixture was diazotized by dropwise addition of a solution of 1.54 g sodium nitrite in 10 ml water to give a yellow suspension.

To a solution of 2.94 g of 2-naphthol in 40 ml ethanol was added a solution of 1.48 g sodium hydroxide in 15 ml water. The mixture was cooled in an ice-salt bath to 0° C. and the diazonium salt prepared above was added dropwise. The mixture immediately turned violet, and soon changed to violet-blue, and finally to red during the addition. The mixture was allowed to warm up and was stirred at room temperature for 19 hours, diluted with water (200 ml), and stirred for 0.5 hour. The red precipitate was collected, washed thoroughly with water, and dried in a vacuum oven at 70° C. for 12 hours to give 9.22 g 1-(5-N-butyl-N-propylphenylsulfonamido-2-hydroxyphenyl)azo-2-naphthol (2) as a black powder; m.p. 144°–146° C.

EXAMPLE 3

This example demonstrates the preparation of N,N-dibutyl-3-hydroxy-4-(5-hydroxy-3-methyl-1-phenyl-1H-pyrazol-4-yl)azo-1-naphthalenesulfonamide (3).

A mixture of 10.0 g Eriochrome Red B, 100 ml ethyl acetate, 10.0 ml isopropenyl acetate, and 1.2 ml concentrated sulfuric acid was stirred at 60° C. for 1.5 hour. A heavy precipitate formed making the stirring difficult. Phosphorus pentachloride (10.0 g) was added in a few portions. The mixture became hot and evolution of HCl gas was observed as the precipitate dissolved. After addition was complete, the mixture was stirred under reflux for two hours. Again a heavy precipitate formed and the stirring had to be very vigorous to avoid overheating and adherance of the precipitate to the flask walls. After cooling, the precipitate was filtered off, washed quickly with ice-cold ethyl acetate, and used immediately without further purification.

The filtered precipitate was mixed with 2.34 g dibutylamine, and 20 ml pyridine and was stirred at 25° C. for 15 min. Thirty ml 20% hydrochloric acid was then added in portions to the reaction mixture. Slowly an oily fraction separated from the solution. The sticky oil obtained was separated from the reaction mixture by decantation of the aqueous fraction, the oil was triturated with water, again separated by decantation, and after addition of 60 ml of 20% hydrochloric acid, the mixture was stirred and refluxed for 1 hr. The oil slowly became a crystalline material. After cooling to room temperature, the crystals were filtered off, washed with water, and dried in a vacuum oven. The crystals were dissolved in 150 ml chloroform, washed with water (3×100 ml), and dried over anhydrous magnesium sulfate. Evaporation of the solvent gave 4.71 g of N,N-dibutyl-3-hydroxy-4-(5-hydroxy-3-methyl-1-phenyl-1H-pyrazol-4-yl)azo-1-naphthalenesulfonamide (3). A small sample of the product was recrystallized from methanol/tetrahydrofuran (1:1) to give red needles; m.p. 173°–174° C.

EXAMPLE 4

This example demonstrates the preparation of N-butyl-N-propylphenyl-3-hydroxy-4-(5-hydroxy-3-methyl-1-phenyl-1H-pyrazol-4-yl)azo-1-naphthalenesulfonamide (4).

A mixture of 10.0 g Eriochrome Red B, 10.0 ml isopropenyl acetate, 100 ml ethyl acetate, and 1.2 ml concentrated sulfuric acid was stirred at 60° C. in an oil bath for 110 minutes, and 10.0 g phosphorous pentachloride was added in portions. The mixture was stirred under reflux for 2 hours. After cooling down, the precipitate was filtered off, washed quickly with cold ethyl acetate, stirred with 20 ml pyridine, and 5.92 g N-butyl-N-(3-phenylpropyl)amine for 1 minute. Thirty ml of a 20% hydrochloric acid was added in portions, and the mixture was stirred overnight. The organic layer was separated and refluxed with 60 ml 20% hydrochloric acid for 1 hr. The oily residue was separated by decantation, dissolved in chloroform, washed with water, and dried over anhydrous magnesium sulfate to give 5.14 g of a deep red solid. The sample was chromatographed on silica gel, with ethyl acetate as the eluent, to give 2.65 g of a dark red solid which was purified further by column chromatography with toluene (as the eluent) to give 0.50 g of 4; m.p. 192° C.

Preparation of Intermediate Compounds Used in the Preparation of Compounds 5, 6, and 7

Preparation of Pyridinium 3-Hydroxy-4-(N-benzoylamino)-1-naphthalenesulfonate Benzoyl chloride (1.8 ml) was added portionwise to a vigorously stirred suspension of 2.39 g 4-amino-3-hydroxy-1-naphthalenesulfonic acid in a mixture of 50 ml pyridine and 20 ml water with cooling in an ice bath. The mixture was stirred for 2 hours at room temperature. The solid product was collected and washed with 10 ml of ice-cold water. Drying in a vacuum oven gave crude pyridinium 3-hydroxy-4-(N-benzolyamino)-1-naphthalenesulfonate (2.55 g, 60%); an analytical sample was prepared by recrystallization from a mixture of tetrahydrofuran and water (9:1), m.p. 225° C.

Preparation of N,N-Diethyl-2-phenylnaphth[1,2-d]oxazole-5-sulfonamide

A mixture of 3.43 g pyridinium 3-hydroxy-4-(N-benzoylamino)-1-naphthalenesulfonate and 10 ml thionyl chloride was refluxed for 3.5 hours. Toluene (20 ml) was added and the excess thionyl chloride was distilled off with toluene under reduced pressure. The solid residue was dissolved in 50 ml methylene chloride and 10 ml diethylamine was added portionwise while stirring. After 30 min, the reaction mixture was poured into 100 ml ice-water and extracted with 100 ml dichloromethane. The organic phase was separated, washed with water, and dried over sodium sulfate. Evaporation of the solvent gave 2.52 g N,N-diethyl-2-phenylnaphth[1,2-d]oxazole-5-sulfonamide of high purity by NMR. Recrystallization from 95% ethanol gave an analytical sample, m.p. 157° C.

Preparation of N,N-Diethyl-4-amino-3-hydroxy-1-naphthalenesulfonamide

A mixture of N,N-diethyl-2-phenylnaphth[1,2-d]oxazole-5-sulfonamide (38.1 g, 100 mmol), 20% KOH (140 ml) and ethanol (180 ml) was refluxed for 24 h under nitrogen and the product was extracted with ethyl acetate (3×500 ml). The combined extracts were dried over anhydrous sodium sulfate and the solvent evaporated to give 45.4 g crude N,N-diethyl-4-amino-3-hydroxy-1-naphthalenesulfonamide as a black sticky oil (50% pure by NMR). An analytical sample was prepared by column chromatography (chloroform) to give pure N,N-diethyl-4-amino-3-hydroxy-1-naphthalenesulfonamide as a glassy material which upon trituration with ether gave a black solid, m.p. 120°-122° C.

Preparation of 2,4-Dihydro-2-ethyl-5-methyl-3H-pyrazol-3-one

A mixture of 49 g 3-methyl-3-pyrazolin-5-one and 60.0 g bromoethane was sealed in a glass pressure tube and heated in an oil bath at 130° C. for 40 hours. After cooling, the tube was opened and the contents were poured into 200 g ice-water. Sodium bicarbonate (42.00 g) was added in small portions with stirring. The resulting mixture was stirred and heated to 100° C. for 1 hour, cooled to room temperature, and extracted with 10×50 ml portions of chloroform. The combined extracts were dried over anhydrous calcium chloride, evaporated under reduced pressure and the residue recrystallized from ethanol to give 20.1 g as colorless prisms, m.p. 112°-113° C.

Preparation of 2,4-Dihydro-5-methyl-2-octyl-3H-pyrazol-3one

A mixture of 19.63 g 3-methyl-3-pyrazolin-5-one and 42.30 g 1-bromooctane was stirred and heated at 135° C. for 50 hour. After cooling, the reaction mixture was triturated with 200 ml water, treated with 17.00 g sodium bicarbonate in small portions, and heated to 100° C. for 1 hour. After cooling, the mixture was extracted with chloroform (3×100 ml portions). The combined extracts were dried over anhydrous calcium chloride and the solvent evaporated to give an oily residue crystallized from hexane (at −5° C.) to give 2,4-dihydro-5-methyl-2-octyl-3H-pyrazol-3-one (17.50 g, 42% yield) as white plates, m.p. 59° C.

Preparation of 2,4-Dihydro-5-methyl-2-(3-phenylpropyl)-3H-pyrazol-3-one

By a procedure similar to that for 2,4-dihydro-5-methyl-2-octyl-3H-pyrazol-3-one, starting from 3-methyl-3-pyrazoline-5-one (19.63 g, 0.20 mol) and 1-bromo-3-phenylpropane (39.80 g, 0.20 mol), 2,4-dihydro-5-methyl-2-(3-phenylpropyl)-3H-pyrazol-3-one (29.40 g, 69%) was obtained as colorless needles, m.p. 130°-105° C.

EXAMPLE 5

This example described the preparation of N,N-diethyl-3-hydroxy-4-(5-hydroxy-3-methyl-1-ethyl-1H-pyrazol-4-yl)azo-1-naphthalenesulfonamide (5). N,N-Diethyl-3-hydroxy-4-amino-1-naphthalenesulfonamide (2.94 g) was dissolved in 10 ml of ethanol and 10 g of ice was added. The reaction mixture was cooled in an ice bath to keep the temperature below 5° C. Hydrochloric acid (3 ml, 37%) was added, followed by dropwise addition of a solution of 0.83 g sodium nitrite in 2 ml water and stirring was continued for 30 minutes. In a separate flask, to a solution of 1.26 g 2,4-dihydro-2-ethyl-5-methyl-3H-pyrazol-3-one in 10 ml ethanol was added 11 ml of 20% aqueous sodium acetate followed by 9 ml of 10% aqueous sodium hydroxide, while the temperature was maintained below 5° C. The diazonium salt (as a suspension) was then added portionwise to the stirred solution of 2,4-dihydro-2-ethyl-5-methyl-3H-pyrazol-3-one at 5° C. and the resulting mixture stirred for 30 min at room temperature. The product was extracted with 100 ml chloroform, the organic layer was washed with 5% formic acid and water, and dried over anhydrous sodium sulfate; and the solvent evaporated to give crude 3.25 g N,N-diethyl-3-diethyl-3-hydroxy-4-(5-hydroxy-3-methyl-1-ethyl-1H-pyrazol-4-yl)azo-1-naphthalenesulfonamide. The product was subjected to column chromatography (toluene) to give pure 2.55 g N,N-diethyl-3-hydroxy-4-(5-hydroxy-3-methyl-1-ethyl-1H-pyrazol-4-yl)azo-1-naphthalenesulfonamide which was recrystallized from methanol to give dark red prisms, m.p. 174°-175° C.

EXAMPLE 6

This example describes the preparation of N,N-diethyl-3-hydroxy-4-(5-hydroxy-3-methyl-1-propylphenyl-1H-pyrazol-4-yl)azo-1-naphthalenesulfonamide (6).

From 2.10 g 2,4-dihydro-5-methyl-2-octyl-3H-pyrazol-3-one by the above procedure was obtained 2.10 g N,N-diethyl-3-hydroxy-4-(5-hydroxy-3-methyl-1-propylphenyl-1H-pyrazol-4-yl)azo-1-naphthalenesulfonamide. Recrystallization from ether/hexane gave m.p. 104°-105° C.

EXAMPLE 7

This example describes the preparation of N,N-diethyl-3-hydroxy-4-(5-hydroxy-3-methyl-1-octyl-1H-pyrazol-4-yl)azo-1-naphthalenesulfonamide (7).

From 2,4-dihydro-5-methyl-2-(3-phenylpropyl)-3H-pyrazol-3-one (2.16 g, 10 mmol) by the above procedure was obtained 4.7 g of a dark red oil which after column chromatography (toluene) gave N,N-diethyl-3-hydroxy-4-(5-hydroxy-3-methyl-1-octyl-1H-pyrazol-4yl)azo-1-naphthalenesulfonamide (2.75 g, 53%). Recrystallization from methanol gave an analytical sample, m.p. 122°-123° C.

EXAMPLE 8

This example describes the preparation of [[2,2-azobis[phenolato]](-2)-N,O,O](pyridine)copper (8).

2,2-Dihydroxyazobenzene (1.07 g, 5.1 mmol), copper(II) acetate monohydrate (1.0 g, 5.0 mmol), potassium tert-butoxide (1.1 g, 9.8 mmol), and methanol (50 ml) were placed into a 125 ml Erlenmeyer flask. The mixture was stirred for 0.25 hr. at room temperature at which time pyridine (2 ml, 25 mmol) was added. The resultant mixture was stirred overnight, whereupon needle-like crystals were isolated by filtration. The crystals were washed with methanol (100 ml) to yield 8 which was purified by repeated recrystallization from dichloromethane/methanol with a few drops of pyridine added. $\lambda_{max}$ (dichloromethane)=504 nm.

EXAMPLE 9

This example describes the preparation of preparation of [[2,2-azobis[phenolato]](-2)-N,O,O](4-(5-nonylpyridine))copper (9).

2,2-Dihydroxyazobenzene (1.07 g, 5.0 mmol), copper(II) acetate monohydrate (1.0 g, 5.0 mmol), potassium tert-butoxide (1.1 g, 9.8 mmol), and methanol (50 ml) were placed into a 125 ml Erlenmeyer flask. The mixture was stirred for 0.25 hr at room temperature at which time 4-(5-nonyl)pyridine (2 ml, 9 mmol) was added. The resultant mixture was stirred overnight, whereupon needle-like crystals were isolated by filtration. The crystals were washed with methanol (100 ml) to yield 9 which was purified by repeated recrystallization from dichloromethane/methanol with a few drops of 4-(5-nonyl) pyridine added; m.p. 140°-142° C.; $\lambda_{max}$ (dichloromethane)=504 nm.

EXAMPLE 10

This example describes the preparation of [1-[5-N,N-dibutylsulfonamido-2-hydroxyphenyl]azo-2-naphthalenolato(-2)](pyridine)copper (10). 1-(5-N,N-dibutylsulfonamido-2-hydroxyphenyl)azo-2-naphthol (1.0 g, 2.2 mmol), copper(II) acetate monohydrate (0.58 g, 2.9 mmol), potassium tert-butoxide (0.27 g, 2.4 mmol), and methanol (50 ml) were placed into a 125 ml Erlenmeyer flask. The mixture was stirred for 0.25 hr at room temperature at which time pyridine (2 ml, 25 mmol) was added. The resultant mixture was stirred overnight, whereupon needle-like crystals were isolated by filtration. The crystals were washed with methanol (100 ml) to yield 10 which was purified by repeated recrystallization from dichloromethane/methanol with a few drops of pyridine added; $\lambda_{max}$ (dichloromethane)=519 nm.

EXAMPLE 11

This example describes the preparation of preparation of [1-[5-N,N-dibutylsulfonamido-2-hydroxyphenyl]azo-2-naphthalenolato(-2)](4-(5-nonylpyridine))copper (11).

1-(5-N,N-dibutylsulfonamido-2-hydroxyphenyl)azo-2-naphthol (1.0 g, 2.2 mmol), copper(II) acetate monohydrate (0.59 g, 3.0 mmol), potassium tert-butoxide (0.26 g, 2.3 mmol), and ethanol (35 ml) were placed into a 125 ml Erlenmeyer flask. The mixture was stirred for 1 hr at room temperature at which time 4-(5-nonyl)pyridine (2 ml, 9 mmol) was added. The resultant mixture stirred overnight, whereupon needle-like crystals were isolated by filtration. The crystals were washed with ethanol (100 ml) to yield 11 which was purified by repeated recrystallization from dichloromethane/methanol with a few drops of 4-(5-nonyl) pyridine added; m.p. 164°-166° C.; $\lambda_{max}$ (dichloromethane)=519 nm.

EXAMPLE 12

This example describes the preparation of [1-[5-N,N-dibutylsulfonamido-2-hydroxyphenyl]azo-2-naphthalenolato(-2)](pyridine)nickel (12).

In a 125 ml Erlenmeyer flask were placed 1-(5-N,N-dibutylsulfonamido-2-hydroxyphenyl)azo-2-naphthol (1.0 g, 2.2 mmol), nickel(II) acetate tetrahydrate (0.57 g, 2.3 mmol), potassium tert-butoxide (0.286 g, 2.3 mmol) and ethanol (50 ml). The solution was stirred for 0.5 minutes and pyridine (2 ml, 25 mmol) was added. The reaction mixture was stirred overnight whereupon a dark crystalline material formed. The solid was purified by repeated recrystallization from dichloromethane/methanol with a few drops of pyridine added; m.p. 193°-195° C.; $\lambda_{max}$ (dichloromethane)=532 nm.

EXAMPLE 13

This example described the preparation of [1-[5-N,N-dibutylsulfonamido-2-hydroxyphenyl]azo-2-naphthalenolato(-2)](4-(5-nonylpyridine)nickel (13).

In a 125 ml Erlenmeyer flask were placed 1-(5-N,N-dibutylsulfonamido-2-hydroxyphenyl)azo-2-naphthol (1.0 g, 2.2 mmol), nickel(II) acetate tetrahydrate (0.56 g, 2.3 mmol), potassium tert-butoxide (0.26 g, 2.3 mmol), and ethanol (50 ml). The solution was stirred for 10 min and 4-(5-nonyl)pyridine (2 ml, 9 mmol) was added. The reaction mixture was stirred overnight whereupon a dark crystalline material formed. The solid was purified by repeated recrystallization from dichloromethane/methanol with a few drops of 4-(5-nonyl)pyridine added; m.p. 173°–175° C.; $\lambda_{max}$ (dichloromethane) = 532 nm.

EXAMPLE 14

This example describes the preparation of [1-[5-N-butyl-N-propylphenylsulfonamido-2-hydroxyphenyl-]azo-2-naphthalenolato(-2)](4-(5-nonylpyridine)nickel (14).

In a 125 Erlenmeyer flask were placed 1-(5-N-butyl-N-propylphenylsulfonamido-2-hydroxyphenyl)azo-2-naphthol (1.04 g, 2.0 mmol), nickel(II) acetate tetrahydrate (0.52 g, 2.1 mmol), potassium tert-butoxide (0.48 g, 4.3 mmol), and methanol (50 ml). The solution was stirred for 0.5 hr and 4-(5-nonyl)pyridine (2 ml g, 9 mmol) was added. The reaction mixture was stirred for an additional 3 hr and then 15 ml of water was added to precipitate the product. The solid was collected and dried. The solid was purified by repeated recrystallization from dichloromethane/methanol with a few drops of 4-(5-nonyl)pyridine; m.p. 136°–137° C.; $\lambda_{max}$ (dichloromethane) = 532 nm.

EXAMPLE 15

This example describes the preparation of [4-[(N,N-dibutylaminosulfonyl-2hydroxy-1-naphthalenyl)azo]-2,4-dihydro-5-methyl-2-phenyl-3H-pyrazol-3-onato(-2)]tris(pyridine)nickel (15).

In a 125 ml Erlenmeyer flask were placed N,N-dibutyl-3-hydroxy-4-(5-hydroxy-3-methyl-1-phenyl-1H-pyrazol-4-yl)azo-1-naphthalene-sulfonamide (1.23 g, 2.3 mmol), nickel(II) acetate tetrahydrate (0.56 g, 2.3 mmol), potassium tert-butoxide (0.26 g, 2.3 mmol), and methanol (50 ml). The solution was stirred for 0.5 hr and pyridine (2 ml, 25 mmol) was added. The reaction mixture was stirred overnight. Some of the solvent was boiled off and then 50 ml of a 4/1 (v/v) methanol/water mixture was added to induce precipitation. The solid was purified by the following procedure: 1) addition of 0.5 ml pyridine to the solid; 2) addition of 50 ml of dichloromethane; 3) addition of 30 ml of methanol; and 4) reduction of the solvent volume. It was necessary to repeat the above procedure two or three times to obtain pure 15; m.p. 182°–184° C.; $\lambda_{max}$ (dichloromethane with ca. 2% pyridine) = 543.5 nm.

EXAMPLE 16

This example describes the preparation of [4[(N,N-dibutylaminosulfonyl-2-hydroxy-1-naphthalenyl)azo]-2,4-dihydro-5-methyl-2-phenyl-3H-pyrazol-3-onato(-2)]tris(4-(5-nonylpyridine)nickel (16).

In a 250 ml Erlenmeyer flask were placed N,N-dibutyl-3-hydroxy-4-(5-hydroxy-3-methyl-1-phenyl-1H-pyrazol-4-yl)azo-1-naphthalene-sulfonamide (1.23 g, 2.3 mmol), nickel(II) acetate tetrahydrate (0.56 g, 2.3 mmol), potassium tert-butoxide (0.27 g, 2.4 mmol), and methanol (50 ml). The solution was stirred for 0.25 hr and 4-(5-nonyl)pyridine (2 ml, 9 mmol) was added. The reaction mixture was stirred overnight. The product was precipitated by addition of 25 ml of water. The solid was collected and washed with a ethanol/water mixture (9/1, v/v), then dissolved in dichloromethane and dried over magnesium sulfate. Heptane was then added and the solvent volume reduced by evaporation. A few ml of methanol were added to the resultant oily solid to yield a crystalline product. Pentane was added to the filtrate which was then allowed to sit for several days in a refrigerator to give more crystals; m.p.99°–102° C.; $\lambda_{max}$ (dichloromethane with ca. 2% 4-(5-nonyl)pyridine) = 543 nm.

EXAMPLE 17

This example describes the preparation of [[2,2-azobis[phenolato]](-2)-N,O,O](4-n-octylpyridine)-platinum (17).

A solution containing 2,2-dihydroxyazobenzene (1.07 g, 5.0 mmol) in 50 ml dimethyl sulfoxide at 70° C. was added to a hot (70° C.) solution of potassium tetrachloroplatinate (1.75 g, 4.2 mmol) in 50 ml dimethyl sulfoxide. After addition of potassium carbonate (2.00 g, 14.5 mmol) the mixture was heated to 165° C. for 10 min, then allowed to cool to 100° C. At this time, 4-n-octylpyridine (0.50 ml, 2.3 mmol) was added. The solution was removed from the heat, placed on a magnetic stirrer, and allowed to stir overnight. The solution was filtered to remove excess potassium carbonate and some dark solids. The filtrate was diluted with water to induce precipitation. The solid was collected, dissolved in dichloromethane, and dried with anhydrous magnesium sulfate. Methanol was added and the solvent volume further reduced to afford a crystalline solid; m.p. 107°–108° C.; $\lambda_{max}$ (dichloromethane) = 479 nm.

EXAMPLE 18

This example describes the preparation of [[2,2-azobis[phenolato]](-2)-N,O,O](ethyl nicotinate)-platinum (18).

A solution containing 2,2-dihydroxyazobenzene (1.08 g, 5.0 mmol) in 50 ml dimethyl sulfoxide at 70° C. was added to a hot (70° C.) solution of potassium tetrachloroplatinate (1.73 g, 4.2 mmol) in 50 ml dimethyl sulfoxide. After addition of potassium carbonate (2.10 g, 15.2 mmol), the mixture was heated to 120° C. for 10 min, then allowed to cool to 100° C. At this time, ethyl nicotinate (2.0 ml, 15 mmol) was added. The solution was removed from the heat, placed on a magnetic stirrer, and allowed to stir overnight. The solution was diluted with 50 ml of water and the resultant solid collected. The solids were washed with water and then dissolved in dichloromethane and dried over anhydrous magnesium sulfate. Methanol was added and the solvent volume further reduced to afford a crystalline solid; m.p. 180°–183° C.; $\lambda_{max}$ (dichloromethane) = 482 nm.

EXAMPLE 19

This example describes the preparation of [[2,2-azobis[phenolato]](-2)-N,O,O](4-(5-nonyl)pyridine)-platinum (19).

A solution containing 2,2-dihydroxyazobenzene (1.07 g, 5.0 mmol) in 50 ml dimethyl sulfoxide at 70° C. was added to a hot (70° C.) solution of potassium tetrachloroplatinate (1.96 g, 6 mmol) in 30 ml dimethyl sulfoxide. The mixture was heated to 100° C. and potassium carbonate (2.07 g, 15.0 mmol) was added. This mixture was then heated to 120° C. for 5 minutes. At this time, 4-(5-nonyl)pyridine (2.0 ml, 9 mmol) was added. The solution was removed from the heat, placed on a magnetic stirrer, and allowed to stir overnight. The solution was reheated and filtered to remove excess potassium carbonate and some dark solids. The filtrate was diluted with 20 ml water to induce precipitation. The solid was collected, dissolved in dichloromethane, and dried with anhydrous magnesium sulfate. Methanol was added and the solvent volume further reduced to afford a crystalline solid; m.p. 114°–117° C.; $\lambda_{max}$ (dichloromethane)=479 nm.

EXAMPLE 20

This example describes the preparation of [1-[5-N,N-dibutylsulfonamido-2-hydroxyphenyl]azo-2-naphthalenolato(-2)](pyridine)palladium (20).

In a 125 ml Erlenmeyer flask were placed 1-(5-N,N-dibutylsulfonamido-2-hydroxyphenyl)azo-2-naphthol (1.1 g, 2.4 mmol) and 40 ml of dimethyl sulfoxide. The solution was heated to 100° C. and was added to a hot (100° C.) solution of potassium tetrachloropalladate (1.0 g, 3.1 mmol) in 50 ml of dimethyl sulfoxide in a 250 ml Erlenmeyer flask. Anhydrous sodium carbonate (2.0 g, 19 mmol) was added with continued stirring. The solution was then heated to 156° C. for 10 min and then cooled to 100° C. whereupon pyridine (2.0 ml, 25 mmol) was added in one portion. The solution was allowed to cool to ambient temperature overnight. The reaction mixture was diluted with 50 ml of distilled water and the resulting orange-brown precipitate collected by vacuum filtration. The solid was then dissolved in dichloromethane and treated with dry anhydrous magnesium sulfate. The solution was then filtered to remove the magnesium sulfate, reheated, and methanol was added. The solution was refrigerated overnight. Flash chromatography on silica gel using dichloromethane allowed the isolation of two fractions. The second red-orange fraction had a m.p. of 214°–215° C.; $\lambda_{max}$ (dichloromethane)=537 nm.

EXAMPLE 21

This example describes the preparation of [1-[5-N,N-dibutylsulfonamido-2-hydroxyphenyl]azo-2-naphthalenolato(-2)](4-(5-nonylpyridine)palladium (21).

In a 125 ml Erlenmeyer flask were placed 1-(5-N,N-dibutylsulfonamido-2-hydroxyphenyl)azo-2-naphthol (1.15 g, 2.5 mmol) and 40 ml of dimethyl sulfoxide. The solution was heated to 100° C. and to this was added a hot (100° C.) solution of potassium tetrachloropalladate (0.98 g, 3.0 mmol) in 50 ml of dimethyl sulfoxide. After the addition was complete, anhydrous sodium carbonate (2.00 g, 19 mmol) was added with continued stirring. The solution was then heated to 150° C. for 10 min and then cooled to 100° C. whereupon 4-(5-nonyl)pyridine (2 ml, 9 mmol) was added in one portion. The solution was cooled to 25° C. and allowed to stir at this temperature for overnight. To the reaction mixture was added 30 ml of water. The resulting orange-brown precipitate was collected by vacuum filtration and washed with water. The solid was then dissolved in dichloromethane and treated with dry anhydrous magnesium sulfate. The solution was then filtered, to remove the magnesium sulfate, and methanol was added and the solvent volume reduced by evaporation to give deep red-orange crystals; m.p. 197°–199° C.; $\lambda_{max}$ (dichloromethane)=536 nm.

EXAMPLE 22

This example describes the preparation of [4-[(N,N-dibutylaminosulfonyl-2-hydroxy-1-naphthalenyl)azo]-2,4-dihydro-5-methyl-2-phenyl-3H-pyrazol-3-onato(-2)](4-(5-nonylpyridine)palladium (22).

In a 125 ml Erlenmeyer flask were placed N,N-dibutyl-3-hydroxy-4-(5-hydroxy-3-methyl-1-phenyl-1H-pyrazol-4-yl)azo-1-naphthalene-sulfonamide (1.3 g, 5.0 mmol) and 50 ml of dimethyl sulfoxide. The solution was heated to 100° C. and to this was added a hot (100° C.) solution of potassium tetrachloropalladate (0.98 g, 3.0 mmol) in 50 ml of dimethyl sulfoxide. Anhydrous sodium carbonate (2.0 g, 19 mmol) was added with continued stirring. The solution was then heated to 150° C. for 10 min and then cooled to 100° C. whereupon 4-(5-nonyl)pyridine (2 ml, 9 mmol) was added. The solution was cooled to 25° C. and allowed to stir at this temperature for overnight. Approximately 10 ml of water was added to the reaction mixture to induce precipitation. The solid was collected by vacuum filtration. The solid was then dissolved in dichloromethane and treated with anhydrous magnesium sulfate. The solution was then filtered; methanol-layered over the top; and then refrigerated. The crystalline solid was purified by preparatory column chromatography on silica using a 2:1 (w/w) toluene/dichloromethane mixture; m.p. 133°–138° C.; $\lambda_{max}$ (dichloromethane)=527 nm.

EXAMPLE 23

This example describes the preparation of [4-[(N-butyl-N-propylphenylaminosulfonyl-2-hydroxy-1-naphthalenyl)azo]-2,4-dihydro-5-methyl-2-phenyl-3H-pyrazol-3-onato(-2)](4-(3-pentylpyridine)palladium (23).

The lower reaction temperatures in this example allow the isolation of the desired product in better yields and with fewer impurities.

In a 125 ml Erlenmeyer flask were placed N-butyl-N-propylphenyl-3-hydroxy-4-(5-hydroxy-3-methyl-1-phenyl-1H-pyrazol-4-yl)azo-1-naphthalene-sulfonamide (1.6 g, 2.7 mmol) and 40 ml of dimethyl sulfoxide. The solution was heated to 85° C. and to this was added a hot (85° C.) solution of potassium tetrachloropalladate (1.0 g, 3.1 mmol) in 50 ml of dimethyl sulfoxide. After the addition was complete, anhydrous potassium carbonate (2.00 g, 14.5 mmol) was added with continued stirring. The solution was then heated to 100° C. for 0.25 hr whereupon 4-(3-pentyl)pyridine (2 ml, 12 mmol) was added. The solution was cooled overnight and the solid collected. The solid was recrystallized from dichloromethane/methanol with a few drops of 4-(3-pentyl)pyridine added; m.p. 164°–167° C.; $\lambda_{max}$ (dichloromethane)=527 nm.

EXAMPLE 24

This example describes the preparation of [4-N,N-diethylaminosulfonyl-2-hydroxy-1-naphthalenyl)azo]-2,4-dihydro-5-methyl-2-ethyl-3H-pyrazol-3-onato(-2)](4-(3-pentylpyridine)palladium (24).

In a 250 ml Erlenmeyer flask were placed N,N-diethyl-3-hydroxy-4-(5-hydroxy-3-methyl-1-ethyl-1H-pyrazol-4-yl)azo-1-naphthalene-sulfonamide (5) (1.08 g, 2.5 mmol) and 45 ml of dimethyl sulfoxide. The solution was heated to 65° C. and to this was added potassium tetrachloropalladate (0.98 g, 2.5 mmol). After the addition was complete, anhydrous potassium carbonate (1.00 g, 7.3 mmol) was added with continued stirring. The solution was then heated to 95° C. for 15 min whereupon 4-(3-pentyl)pyridine (0.52 g, 3.5 mmol) was added in one portion. The solution was cooled to 25° C. and allowed to stand at this temperature overnight. The resulting crystalline mass was collected by filtration and the solid washed with cold methanol. The material was recrystallized from dichloromethane/methanol with a few drops of 4-(3-pentyl)pyridine added; m.p. 215°–219° C.

EXAMPLE 25

This example describes the preparation of [4-[(N,N-diethylaminosulfonyl-2-hydroxy-1-naphthalenyl)azo]-2,4-dihydro-5-methyl-2-propylphenyl-3H-pyrazol-3-onato(-2)](4-(3-pentylpyridine)palladium (25).

In a 250 ml Erlenmeyer flask were placed N,N-diethyl-3-hydroxy-4-(5-hydroxy-3-methyl-1-propylphenyl-1H-pyrazol-4-yl)azo-1-naphthalene-sulfonamide (6) (1.30 g, 2.5 mmol) and 45 ml of dimethyl sulfoxide. The solution was heated to 60° C. and to this was added potassium tetrachloropalladate (0.98 g, 2.5 mmol). After the addition was complete, anhydrous potassium carbonate (1.00 g, 7.3 mmol) was added with continued stirring. The solution was then heated to 85° C. for 35 min whereupon 4-(3-pentyl)pyridine (0.52 g, 3.5 mmol) was added. The solution was cooled to 25° C. and allowed to stand at this temperature for overnight. The resulting crystalline mass was collected by vacuum filtration and washed with cold methanol. The solid was recrystallized from dichloromethane/methanol/isopropanol with a few drops of 4-(3-pentyl)pyridine added; m.p. 123°–127° C.

EXAMPLE 26

This example describes the preparation of [4-[(N,N-diethylaminosulfonyl-2-hydroxy-1-naphthalenyl)azo]-2,4-dihydro-5-methyl-2-octyl-3H-pyrazol-3-onato(-2)](4-(3-pentylpyridine)palladium (26).

In a 250 ml Erlenmeyer flask were placed N,N-diethyl-3-hydroxy-4-(5-hydroxy-3-methyl-1-octyl-1H-pyrazol-4-yl)azo-1-naphthalene-sulfonamide (7) (1.32 g, 2.5 mmol) and 45 ml of dimethyl sulfoxide. The solution was heated to 70° C. and to this was added potassium tetrachloropalladate (0.98 g, 2.5 mmol). After the addition was complete, anhydrous potassium carbonate (1.00 g, 7.3 mmol) was added with continued stirring. The solution was then heated to 85° C. whereupon 4-(3-pentyl)pyridine (0.52 g, 3.5 mmol) was added in one portion. The solution was cooled to 25° C. and then allowed to stand at this temperature overnight. The resulting crystalline mass was then collected by filtration and washed with cold methanol. The material was recrystallized from dichloromethane/methanol; m.p. 149°–153° C.

EXAMPLE 27

This example describes the preparation of aqua[[2,2-azobis[phenolato]](-2)-N,O,O](2,4-pentanedionato-O,O)chromium (27).

In a 200 ml round bottom flask were placed 2,2-dihydroxyazobenzene (4.28 g, 20.0 mmol), chromium(III) acetate monohydrate (19.94 g, 80.6 mmol), 2,4-pentanedione (20.6 ml, 200.0 mmol), and 80 ml dimethyl formamide. This dark yellow-green reaction mixture was refluxed with stirring for 1 hr. The resultant deep red-purple solution was cooled to 25° C. and then poured into 400 ml distilled water containing several drops of concentrated sulfuric acid. The resulting red-purple solid was collected by filtration, washed several times with distilled water, and then dried in a vacuum oven at about 40° C. To the crude reaction product was added about 300 ml acetone and the acetone was reduced in volume to about 125 ml by distillation. The solution was cooled to 25° C. followed by cooling to 0° C. to afford 4.15 g (54% yield) of 27 which was recrystallized from a mixture of hot acetone/methanol/toluene (5:1:1); $\lambda_{max}$ (methanol)=540, 514, 440 nm.

EXAMPLE 28

This example describes the preparation of [[2,2-azobis[phenolato]](-2)-N,O,O](pyridine)(2,4-pentanedionato-O,O)chromium (28).

In a 100 ml round bottom flask were placed compound 27 (1.14 g, 3.0 mmol), and 70 ml dichloromethane. To this stirred solution was added pyridine (1.61 ml, 15.0 mmol). The progress of the reaction could be conveniently followed by thin layer chromatography on silica gel using an eluent mixture of 75% dichloromethane, 20% hexane, and 5% acetone. After stirring for 4 hr, the reaction solvent was removed under vacuum to afford a dark red-purple oil. This oil was triturated by adding several portions of hexane and scraping the sides of the flask. The resulting brown solid was collected by filtration and dried under vacuum to afford 1.08 g (77% yield) of compound 28. An analytical sample, containing one-half mole of dichloromethane solvate, was obtained by several recrystallizations from hot dichloromethane/hexane; m.p. 260° C.; $\lambda_{max}$ (methanol)=550, 525, 450 nm.

EXAMPLE 29

This example describes the preparation of [[2,2-azobis[phenolato]](-2)-N,O,O](2,4-pentanedionato-O,O)(4-(5-nonyl)pyridine)chromium (29).

In a 100 ml round bottom flask was placed compound 27 (0.50 g, 1.31 mmol), followed by 30 ml dichloromethane. To this stirred solution was added 4-(5-nonyl)pyridine (1.5 ml, 6.5 mmol) and stirring was continued at 25° C. for overnight. The solvent was removed under vacuum and after standing overnight in the freezer a dark purple crystalline mass was obtained. This material was collected by vacuum filtration and washed with petroleum ether. An analytical sample was obtained by several recrystallizations from cold dichloromethane/heptane/toluene/petroleum ether; m.p. 189°–190° C.; $\lambda_{max}$ (heptane)=572, 535 nm.

EXAMPLE 30

This example describes the preparation of [[2,2-azobis[phenolato]](-2)-N,O,O](2,4-pentanedionato-O,O)(4-nonanoylpyridine)chromium (30).

In a 50 ml round bottom flask was placed compound 27 (0.323 g, 0.85 mmol), followed by 25 ml dichloromethane. To this stirred solution was added 4-nonanoyl-pyridine (0.24 g, 1.1 mmol) and stirring was continued at 25° C. for overnight. The solution was filtered and heptane was added. Slow evaporation of the solvent followed by vigorous scraping afforded a dark purple crystalline product. The sample was recrystallized from dichloromethane/petroleum ether; m.p. 126°–128° C.

EXAMPLE 31

This example describes the preparation of [[2,2-azobis[phenolato]](-2)-N,O,O](2,4-pentanedionato-O,O)(4-ethylpyridine)chromium (31).

In a 100 ml round bottom flask were placed compound 27 (0.57 g, 1.5 mmol) and 35 ml of methylene chloride. To this stirred solution was added 4-ethylpyridine (0.86 ml, 7.5 mmol). After stirring for 4 hr the reaction solvent was removed under vacuum to afford a deep-purple oil. This oil was triturated by adding several portions of hexane and scraping the sides of the flask. The resulting red-purple solid was dried under vacuum to afford 0.48 g (68% yield) of compound 31. An analytical sample, containing one-quarter molecule of methylene chloride solvate, was obtained by several recrystallizations from hot methylene chloride/hexane; m.p. 204°-208° C.; $\lambda_{max}$ (heptane)=571, 536 nm.

EXAMPLE 32 this example describes the preparation of [[2,2-azobis[phenolato]](-2)-N,O,O](2,4-pentanedionato-O,O)(ethyl nicotinate)chromium (32).

In a 100 ml round bottom flask were placed compound 27 (0.70 g, 1.8 mmol) followed by 50 ml of methylene chloride. To this stirred solution was added ethylnicotinate (0.74 ml, 5.4 mmol). After stirring for 16 hr the reaction solvent was removed under vacuum to afford a red-purple oil. This oil was triturated by adding several portions of hexane and scraping the sides of the flask. The resulting solid was recrystallized from hot methylene chloride/hexane to afford 0.91 g (98% yield) of compound 32; m.p. 114°-122° C.; $\lambda_{max}$ (methanol)=545, 525, 455 nm.

EXAMPLE 33

This example describes the preparation of [[2,2-azobis[phenolato]](-2)-N,O,O](2,4-pentanedionato-O,O)(ethyl isonicotinate)chromium (33).

In a 100 ml round bottom flask were placed compound 27 (0.50 g, 1.31 mmol), followed by 40 ml dichloromethane. To this stirred solution was added ethyl isonicotinate (0.59 ml, 3.9 mmol) and stirring was continued at 25° C. for overnight. The solvent was removed under vacuum to afford a dark purple oil. This oil was triturated to a red-purple oily solid by the addition of several portions of petroleum ether with vigorous scraping. An analytical sample was obtained by several recrystallizations from hot dichloromethane/heptane; m.p. 156°-159° C.; $\lambda_{max}$ (heptane)=573, 538 nm.

EXAMPLE 34

This example describes the preparation of aqua[2-[[(4,6-dimethoxy-2-hydroxyphenyl)imino]methyl]-4-nitrophenolato-N,O,O](2,4-pentanedionato-O,O)-chromium ($H_2O$) (34).

Compound 34 was prepared using procedures described in U.S. Pat. No. 3,929,848 (Example 12). In a 250 ml two-neck flask equipped with a Dean-Stark trap and reflux condenser were placed chromium(III) chloride hexahydrate (4.00 g, 0.015 mol), 40 ml dimethyl formamide, and 50 ml toluene. The contents of the flask were heated with separation of water as a toluene/water azeotrope. Next, 100 ml isopropanol was added followed by heating to remove the toluene as a isopropanol/toluene azeotrope. After approximately 150 ml distillate was collected, the flask was cooled and 2-hydroxy-4,6-dimethoxybenzald(2-hydroxy-5-nitrophenyl)imine (4.77 g, 0.015 mol) was added. The reaction mixture was then heated at 90° C. for 15 hr. The solution was cooled to 60° C. and 2,4-pentanedione (1.54 ml, 0.015 mol) and tri-n-butylamine (3.57 ml, 0.015 mol) were added and heating was continued for another 2.5 hr. The mixture was cooled and then poured into a total of 800 ml distilled water containing several drops concentrated hydrochloric acid. The resulting yellow-brown solid was dried in vacuo to afford 4.78 g of 34 (58% yield); $\lambda_{max}$ (methanol)=460, 435, 405, 380, 328, 321, 309 nm.

EXAMPLE 35

This example describes the preparation of [6-[[(2-hydroxy-5-nitrophenyl)imino]methyl]-3,5-dimethoxyphenolato-N,O,O](3-butylpyridine)(2,4-pentanedionato-O,O)chromium (35).

In a 100 ml round bottomed flask were place compound 35 (0.50 g, 1.0 mmol) and 25 ml of methylene chloride. To this stirred solution was added 3-n-butylpyridine (0.76 ml, 5.2 mmol). After stirring overnight the reaction solvent was removed under vacuum to afford a brown oil. This oil was triturated by adding several portions of hexane and scraping the sides of the flask. The resulting yellow-brown solid was dried in vacuo to afford 0.52 g (88% yield) of compound 35 which was recrystallized from hot absolute ethanol; m.p. 233°-237° C.

EXAMPLE 36

This example describes the preparation of aqua[2-[[(4,6-di-n-propoxy-2-hydroxyphenyl)imino]methyl]-4-nitrophenolato-N,O,O](2,4-pentanedionato-O,O)-chromium ($H_2O$) (36).

Compound 36 was prepared using procedures described in U.S. Pat. No. 3,929,848 (Example 12). In a 100 ml two-neck flask equipped with a Dean-Stark trap and reflux condenser were placed chromium(III) chloride hexahydrate (0.735 g, 2.76 mmol), 10 ml dimethyl formamide, and 20 ml toluene. The contents of the flask were heated with separation of water as a toluene/water azeotrope. Next, 20 ml isopropanol was added followed by heating to remove the toluene as a isopropanol/toluene azeotrope. After approximately 40 ml distillate was collected, the flask was cooled and 2-hydroxy-4,6-di-n-propoxybenzald(2-hydroxy-5-nitrophenyl)imine (1.03 g, 2.76 mmol) was added. The reaction mixture was then heated at 95° C. for 17 hr. The solution was cooled to 65° C. and 2,4-pentanedione (0.3 ml, 3.0 mmol) and tri-n-butylamine (0.66 ml, 2.76 mmol) were added and heating was continued for another 3.5 hr. The mixture was cooled and then poured into a total of 250 ml of distilled water containing several drops of concentrated hydrochloric acid. The resulting yellow-brown oil was extracted with several portions of dichloromethane and then dried over anhydrous magnesium sulfate. The solution was filtered and the solvent removed under vacuum to afford a very dark brown oil. Upon standing under high vacuum a dark brown solid of compound 36 resulted.

EXAMPLE 37

This example describes the preparation of [6-[[(2-hydroxy-5-nitrophenyl)imino]methyl]-3,5-di-n-propoxyphenolato-N,O,O](ethyl nicotinate)(2,4-pentanedionato-O,O)chromium (37).

In a 100 ml round bottom flask were placed compound 36 (0.979 g, 2.0 mmol) followed by 40 ml of dichloromethane. To this solution was then added ethyl nicotinate (0.82 ml, 6.0 mmol) and the reaction mixture was allowed to stir overnight. The solvent was then removed under vacuum to afford a dark brown oil. This oil was then passed through a column of alumina, which had been deactivated with 4.8% by weight with water and 0.4% by volume with ethyl nicotinate, using 10% dichloromethane/90% hexane as the eluent. After evaporation of the solvent from the combined yellow-orange fractions, the resulting dark yellow-brown oil was triturated with petroleum ether to afford a yellow-brown solid; m.p. 170°–174° C.; $\lambda_{max}$ (methanol)=409, 440 nm.

EXAMPLE 38

This example describes the preparation of [[2,2'-azobis[phenolato]](-2)-N,O,O'](triphenylphosphine)-nickel (38).

Compound 38 was prepared in a similar fashion to 9, except triphenylphosphine was used in place of pyridine and Ni(II) chloride hexahydrate was used in place of Cu(II) acetate monohydrate; m.p. 215°–217° C.; $\lambda_{max}$ (dichloromethane)=507 nm.

EXAMPLE 39

This example describes the preparation of [4-[N,N-dibutylaminosulfonyl-2-hydroxy-1-naphthalenyl)azo)-2,4-dihydro-5-methyl-2-phenyl-3H-pyrazol-3-onato(-2)](trihenylphosphine)platinum (39).

Compound 39 was prepared analogously to compound 22, except that potassium tetrachloroplatinate was used instead of potassium tetrachloropallidate and triphenylphosphine was used in place of the pyridine ligand; m.p. 243°–245° C.; $\lambda_{max}$ (dichloromethane)=526 nm.

EXAMPLE 40

In this example, the separation of isomers is described for compound 21. Isomers can arise owing to a number of reasons. In this case, the isomers are due to different aromatic groups attached to the azo group. The separation was accomplished using preparatory thin layer chromotography on silica gel plates using dichloromethane as the eluent. The least abundant isomer, Isomer a, had the higher $R_f$ value. Isomer a melted at 180° C. and Isomer b melted at 206° C. The visible absorption spectra of the isomers is shown in FIG. 1. It is important to note that the spectra are different and for some applications the use of the separate isomers maybe advantageous.

THERMAL TRANSFER EXAMPLES

The following is a description of the various coating formulations referred to in the examples of this application. All dye donor sheets were coated with a number 8 wire-wound coating rod (0.72 mil wet thickness) onto 5.7 micron Teijin F22G polyester film (Teijin Ltd., Tokyo, Japan), and dried in a current of air at ambient temperature. With the exception of commercially available dye receptor sheets, all receptor sheets were extrusion coated onto 4 mil polyethylene terephthalate film and dried in an oven to give a dry coating thickness of 4 g/m².

EXAMPLE 41

This example describes the construction of donor sheet A. The donor sheet was prepared from the following formulation:

| | |
|---|---|
| 0.06 g | dye |
| 0.035 g | Goodrich Geon 178 ™ polyvinyl chloride (PVC), available from BF Goodrich, Geon Vinyl Division (Cleveland, OH) |
| 0.0025 g | Goodyear Vitel polyester 200 ™, available from Goodyear Chemicals (Akron, OH) |
| 0.014 g | RD 1203 ™ (60/40 blend of octadecyl acrylate and acrylic acid, 3M Company, St. Paul, MN) |
| 0.014 g | Troy CD 1 ™ (Chemical Abstracts Registry Service Number: 64742-88-7), available from Troy Chemical (Newark, NJ) |
| 0.372 g | 2-butanone |
| 2.653 g | tetrahydrofuran |

EXAMPLE 42

This example describes the construction of donor sheet B. The donor sheet was prepared from the same formulation as shown in Example 41, except that cellulose acetate butyrate (CAB-551 ™, Eastman Chemical Products, Inc., Kingsport, TN) was used instead of Goodrich Geon-178 ™ poly(vinyl chloride).

EXAMPLE 43

This example describes the construction of receptor sheet A. The receptor sheet was made from the following formulation:

| | |
|---|---|
| 2.89 wt % | ICI Atlac 382 ES ™ bisphenol A fumarate polyester, available from ICI Americas (Wilmington, DE) |
| 2.33 wt % | Goodrich Temprite 678x512 ™ (62.5% chlorinated polyvinyl chloride (CPVC)) |
| 0.47 wt % | Shell Epon 1002 ™ epoxy resin, available from Shell Chemical (Oakbrook, IL) |
| 0.47 wt % | Goodyear Vitel PE 200 ™ polyester |
| 0.58 wt % | 3M Fluorad FC 430 ™ fluorocarbon surfactant, available from 3M Company, Industrial Chemical Products Division (Saint Paul, MN) |
| 0.17 wt % | Ciba-Geigy Tinuvin 328 ™ UV stabilizer, available from Ciba-Geigy Additives Department (Hawthorne, NY) |
| 0.29 wt % | BASF Uvinul N539 ™ UV stabilizer, available from BASF Wyandotte, Uvinul Department (Parsippany, NJ) |
| 0.58 wt % | Ferro Therm-Check 1237 ™ heat stabilizer, available from Ferro Corporation, Chemical Division (Bedford, OH) |
| 0.93 wt % | Eastman Kodak DOBP ™ (4-dodecyloxy-2-hydroxybenzophenone, available from Eastman Chemical Products, Inc., Kingsport, TN) |
| 25.17 wt % | 2-butanone |
| 66.12 wt % | tetrahydrofuran |

EXAMPLE 44

This example describes the preparation of receptor sheet B. Receptor sheet B was Dai Nippon Opaque ™ receptor (Dai Nippon Printing, Japan) which was used as received, with dye transfer to the coated side.

EXAMPLE 45

This example describes the use of thermal printer A. Thermal printer A used a Kyocera raised glaze thin film thermal print head with 8 dots/mm and 0.3 watts per dot. In normal imaging, the electrical energy varied from 0 to 14 joules/cm², which corresponds to head voltages from 0 to 20 volts with a 4 to 23 msec pulse.

Dye donor and dye receptor sheets were assembled and imaged with the thermal print head with a burn time of 23 msec at 16.5 V, and a burn profile of 70–255 msec on and 0–150 msec off. Eight levels of graduation were used.

The resulting image density (reflectance optical density) for each level of gradation was measured with a MacBeth TR527 ™ densitometer (MacBeth Instrument Co., Newburgh, N.Y.).

EXAMPLE 46

This example describes the thermal transfer of dyes 31, 35, and 38 using donor sheet A and receptor sheet A. The results are summarized in Table 1.

TABLE 1

| Cmpd | Color | Image Density (Reflectance Optical Density) Measured at Level # | | | | | | | |
|---|---|---|---|---|---|---|---|---|---|
| | | 1 | 2 | 3 | 4 | 5 | 6 | 7 | 8 |
| 31 | red-magenta | 0.13 | 0.21 | 0.31 | 0.40 | 0.48 | 0.55 | 0.65 | 0.71 |
| 35 | orange | 0.09 | 0.10 | 0.10 | 0.13 | 0.20 | 0.23 | 0.24 | 0.28 |
| 38 | yellow-brown | 0.16 | 0.18 | 0.25 | 0.34 | 0.45 | 0.52 | 0.62 | 0.72 |

EXAMPLE 47

This example describes the thermal transfer of dyes 31, 35, and 38 using donor sheet A and receptor sheet B. The results are summarized in Table 2.

TABLE 2

| Cmpd | Color | Image Density (Reflectance Optical Density) Measured at Level # | | | | | | | |
|---|---|---|---|---|---|---|---|---|---|
| | | 1 | 2 | 3 | 4 | 5 | 6 | 7 | 8 |
| 31 | red-magenta | 0.09 | 0.18 | 0.28 | 0.36 | 0.44 | 0.50 | 0.59 | 0.67 |
| 35 | orange | 0.04 | 0.08 | 0.12 | 0.15 | 0.18 | 0.23 | 0.26 | 0.31 |
| 38 | yellow-brown | 0.14 | 0.21 | 0.31 | 0.41 | 0.49 | 0.58 | 0.67 | 0.73 |

EXAMPLE 48

This example describes the thermal transfer of dyes 31 using donor sheet B and receptor sheet B. The result are summarized in Table 3.

TABLE 3

| Cmpd | Color | Image Density (Reflectance Optical Density) Measured at Level # | | | | | | | |
|---|---|---|---|---|---|---|---|---|---|
| | | 1 | 2 | 3 | 4 | 5 | 6 | 7 | 8 |
| 31 | red-magenta | 0.08 | 0.15 | 0.24 | 0.31 | 0.41 | 0.51 | 0.59 | 0.62 |

EXAMPLE 49

The Differential Scanning Calorimeter scans of analytically pure compounds 8 and 9 are shown in FIGS. 2 and 3, respectively. This result shows that the pyridine adduct, 8, does not exhibit a clean melt, whereas compound 9 has a classic melting transition associated with organic-like compounds.

EXAMPLE 50

The Differential Scanning Calorimeter scans of analytically pure compounds 10 and 11 are shown in FIGS. 4 and 5, respectively. This result shows that the pyridine adduct, 10, does not exhibit a clean melt, whereas compound 11 has a classic melting transition associated with organic-like compounds.

EXAMPLE 51

Thermogravimetric analysis on the copper compounds in Examples 49 and 50. The temperature at which 50% of the pyridine ligand is lost is shown in Table 4.

TABLE 4

| Temperature of 50% Loss of Pyridine Ligand. | |
|---|---|
| Compound | Temperature of 50% Loss of Pyridine Ligand (°C.) |
| 8 | 133 |
| 9 | 148 |
| 10 | 180 |
| 11 | 223 |

EXAMPLE 52

Figure 6:
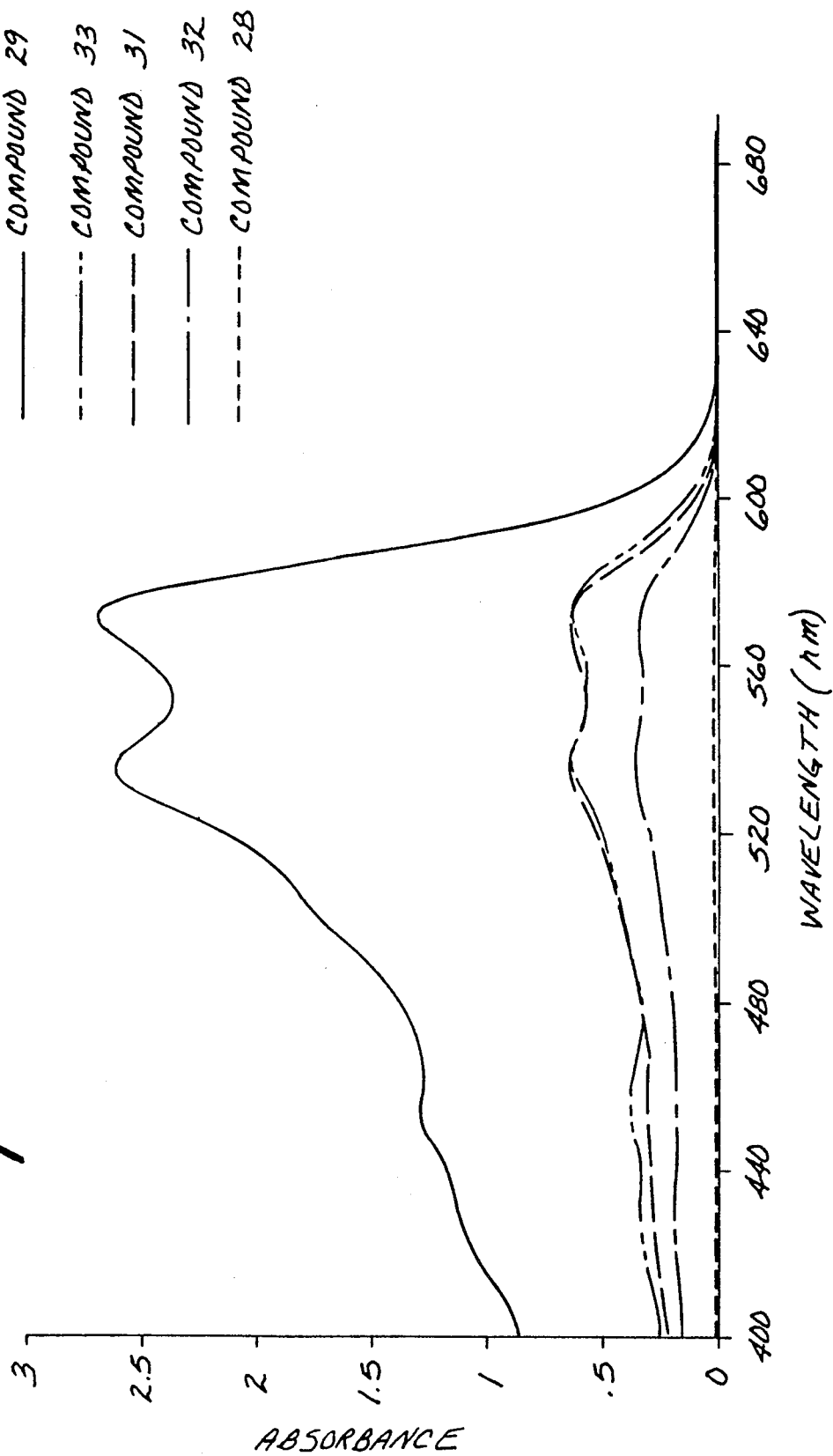
FIG. 6: Optical spectra of heptane solutions of the chromium complexes at room temperature (22° C.).

Melting point data and solubility data for derivatives of chromium-azo derivatives with pyridine and substituted pyridine are shown in Table 5. FIG. 6 shows optical spectra of heptane solutions of the chromium complexes at room temperature (22° C.). The samples were prepared by shaking the dye in heptane for several hours, allowing the samples to sit overnight, and filtering through a plug of glass wool to remove particulates. This example teaches that the metal-azo derivatives with substituted pyridines, generally, melt at a lower temperature and have greater solubility than the corresponding pyridine derivative. It is noteworthy that even substituents as small as an ethyl group have a significant effect on the melting point and solubility.

TABLE 5

| Melting Point and Solubility Data on Chromium Metal-Azo Complexes. | | |
|---|---|---|
| Compound | Melting Point (°C.) | Absorbance at Maximum in Heptane/1 mm Cell |
| 28 | 260 | 0.022 |
| 32 | 119–122 | 0.362 |
| 33 | 156–159 | 0.634 |
| 31 | 204–208 | 0.644 |
| 29 | 189–190 | 2.69 |

EXAMPLE 53

Melting point and solubility data at ambient temperature in heptane (optical density of in heptane) of four-coordinate platinum derivatives are summarized in Table 6. This example shows the enhanced solubility of alkyl-substituted pyridines of this invention compared to the pyridine adduct. Alkyl groups have a pronounced effect on both the melting point and the solubility in hydrocarbon-based solvents.

TABLE 6
Melting Point and Solubility Data on Platinum Metal-Azo Complexes.

| Compound | Melting Point (°C.) | Absorbance at Maximum in Heptane/1 mm Cell |
|---|---|---|
| Pt(DHAB)Py[a] | 217 | 0.41 |
| 18 | 180–183 | 0.08[b] |
| 17 | 107–108 | 2.49 |
| 19 | 114–117 | 8.17[c] |

[a]Pt(DHAB)py = [[2,2-azobis[phenolato]](-2)-N,O,O](pyridine)platinum.
[b]result obtained by measuring in a 1 cm cell and dividing result by 10.
[c]estimate based on fitting the spectrum in the 510–550 nm region.

EXAMPLE 54

In this example, a comparison between metal-free azo dyes and metallized dyes with melting points less than the unmetallized ligand are tabulated. See Table 7.

TABLE 7

| Compound | Melting Point of Azo Ligand (°C.) | Melting Point of Metal-Azo Compound (°C.) |
|---|---|---|
| O,O'-dihydroxyazobenzene | 173–175 | — |
| 2 | 144–146 | — |
| 4 | 192 | — |
| 9 | — | 140–142 |
| 17 | — | 107–108 |
| 19 | — | 114–117 |
| 16 | — | 99–102 |
| 23 | — | 164–167 |

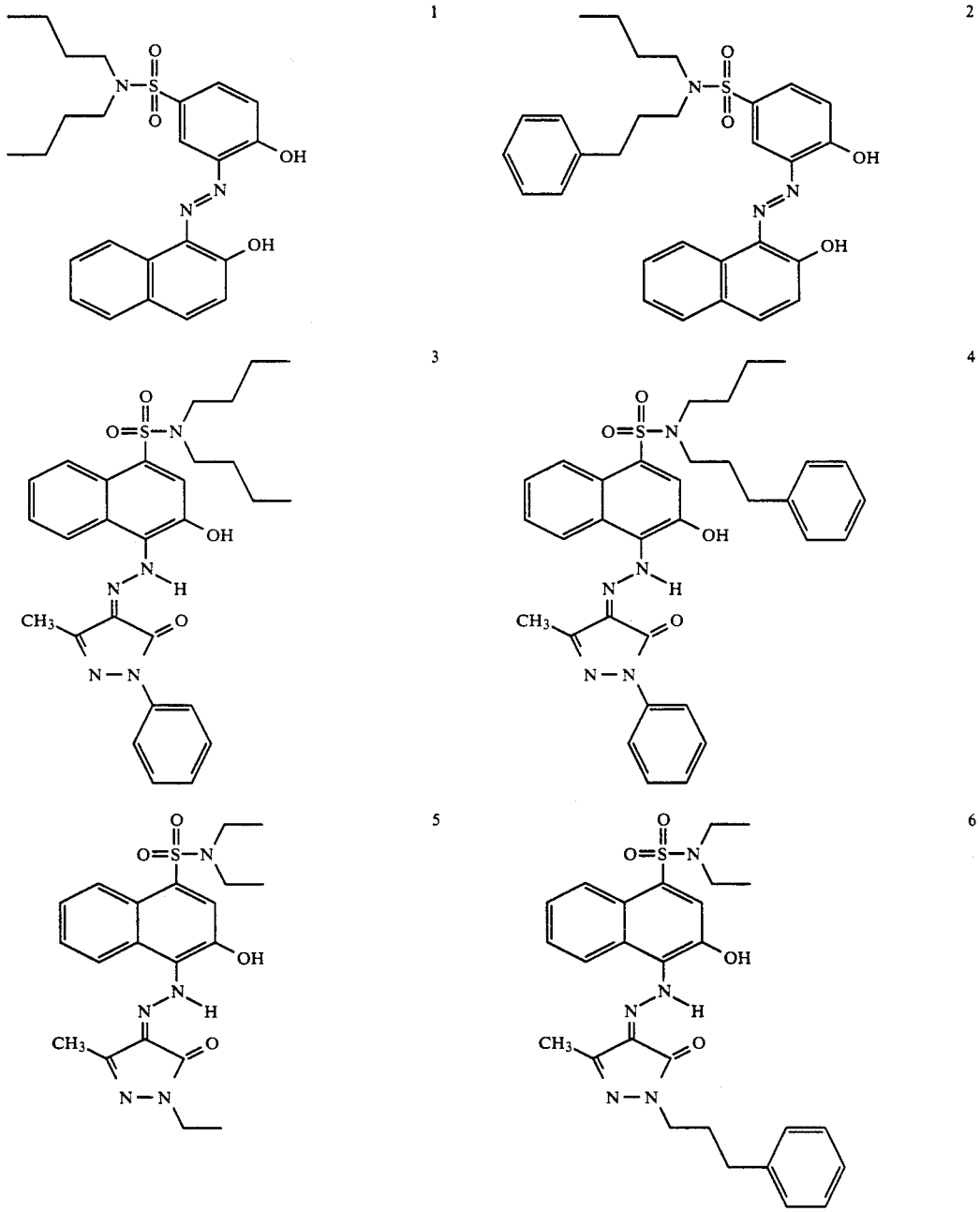

-continued
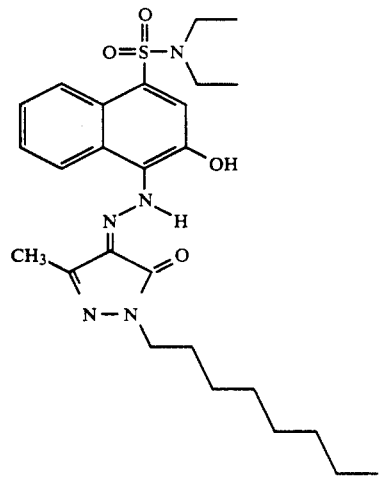
7
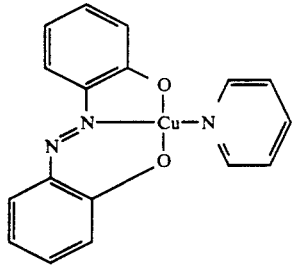
8
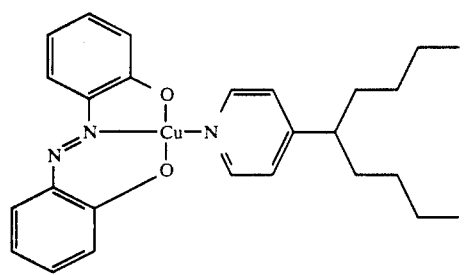
9
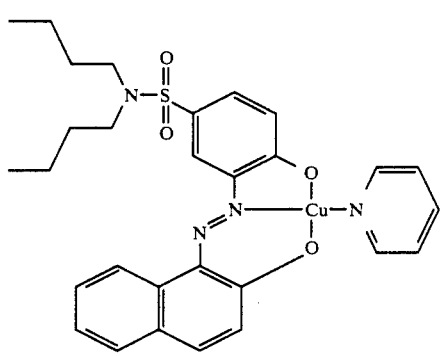
10
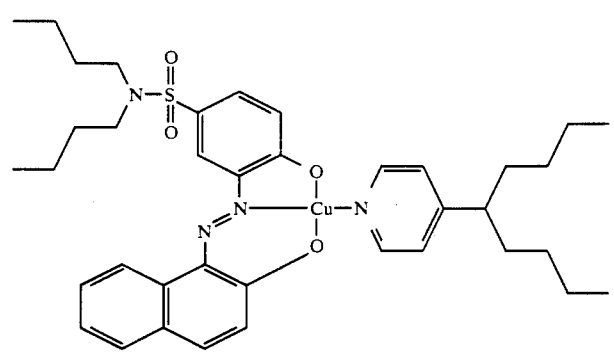
11
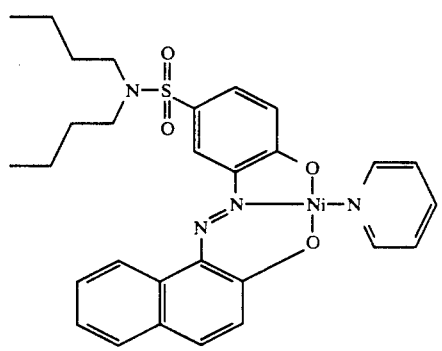
12

13
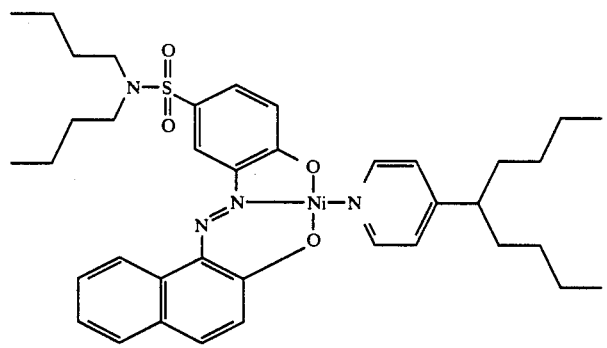
14
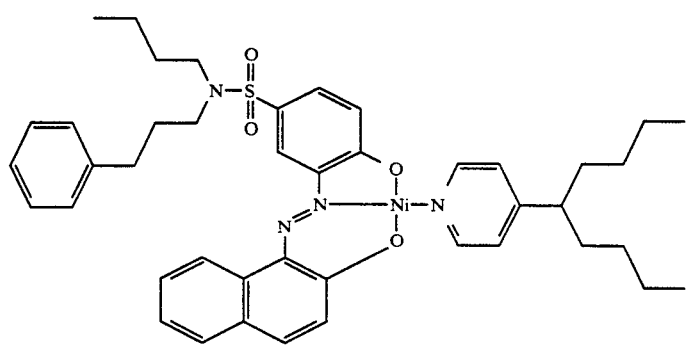
15
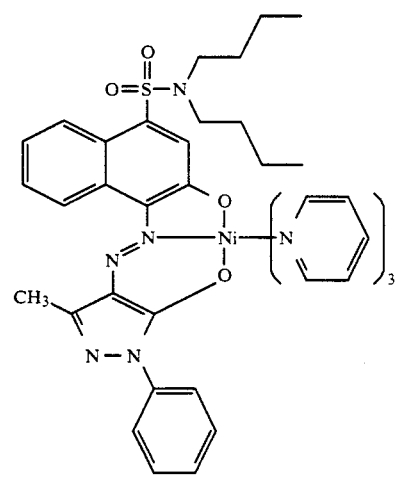
16
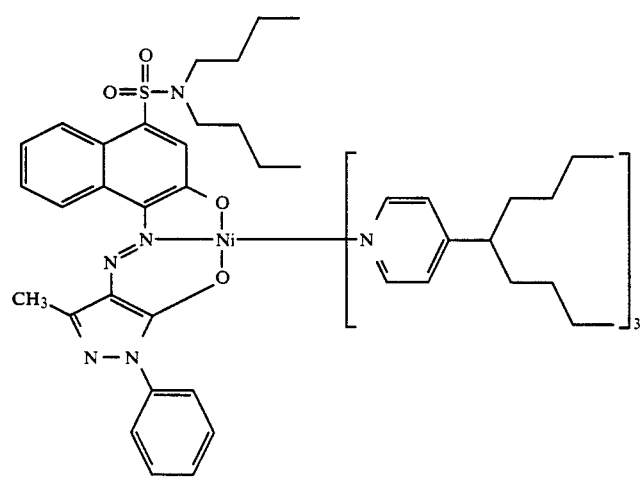

-continued
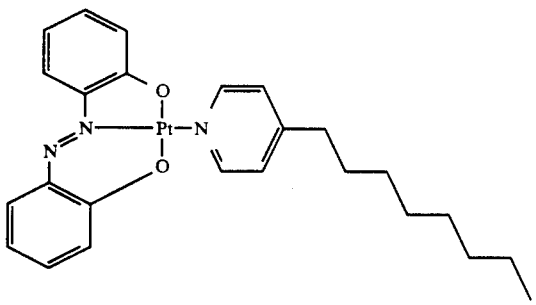
17
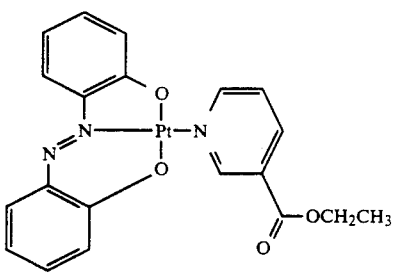
18
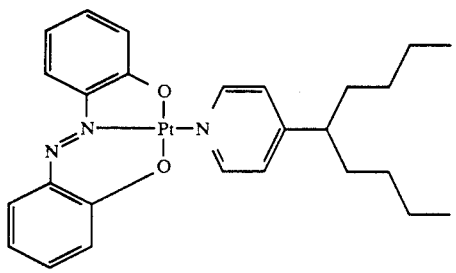
19
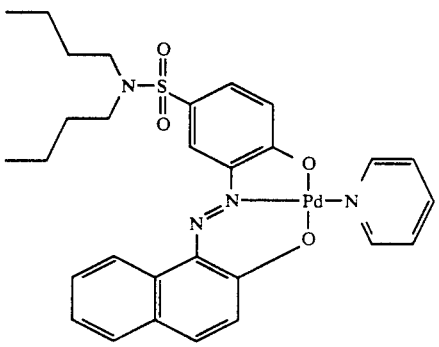
20
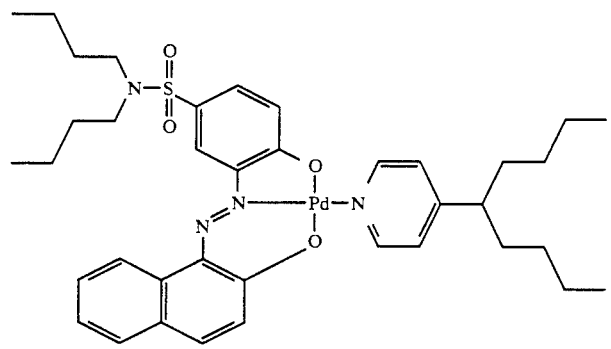
21
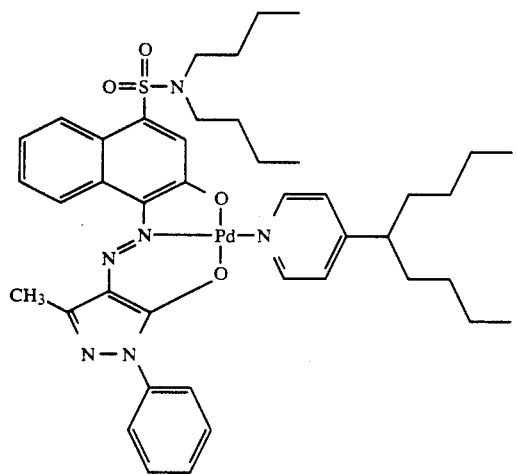
22
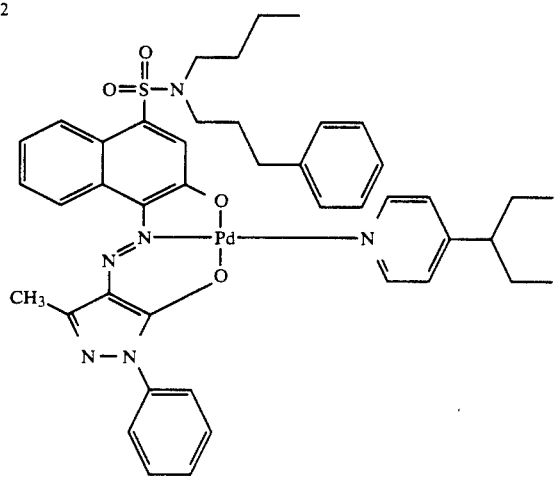
23

-continued
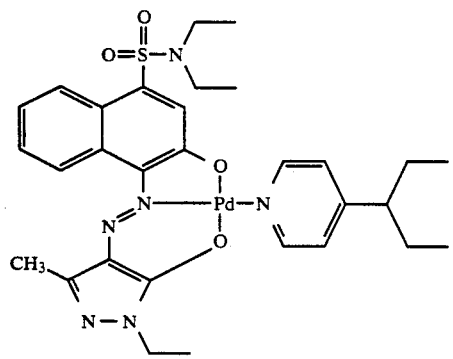
24
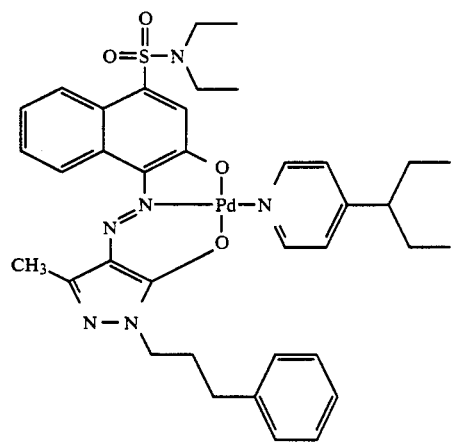
25
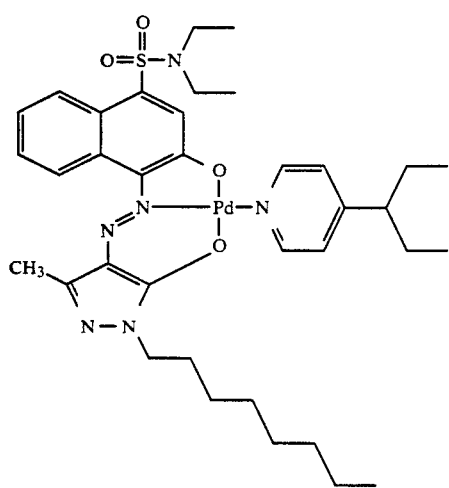
26
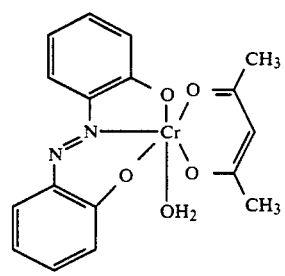
27
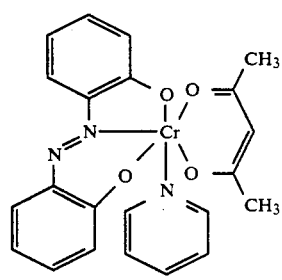
28
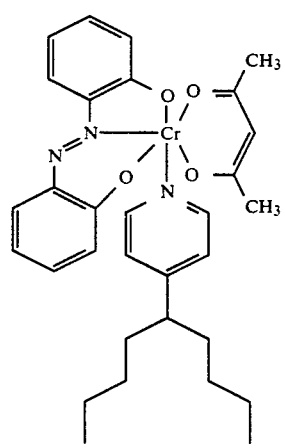
29

-continued
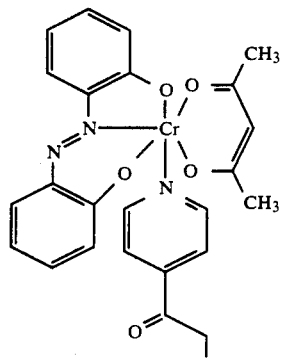 30
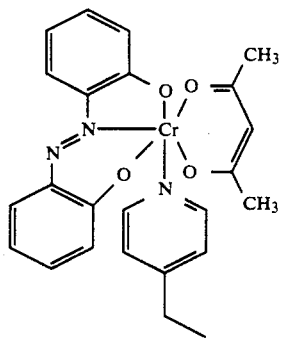 31
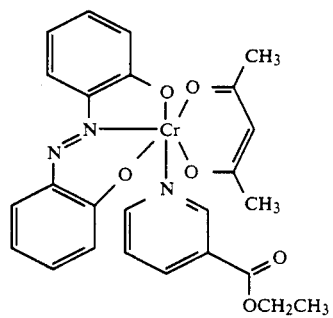 32
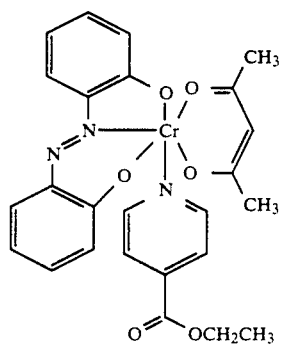 33
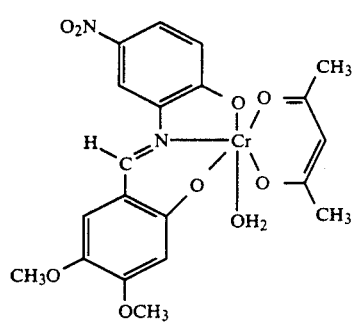 34
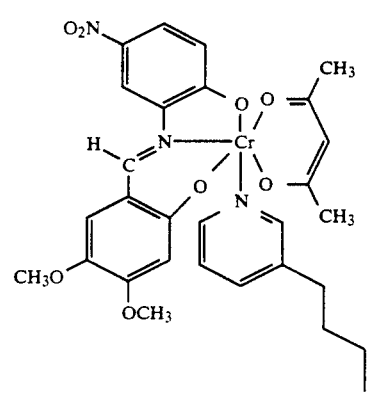 35

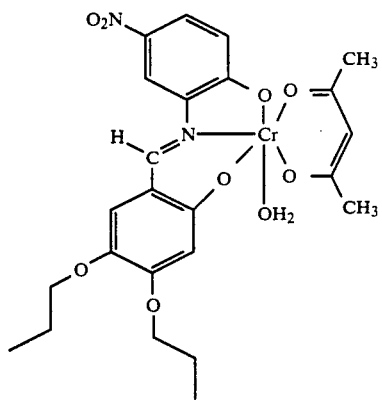

36

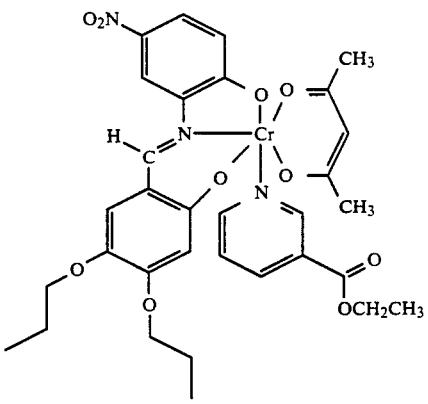

37

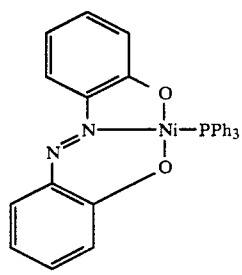

38

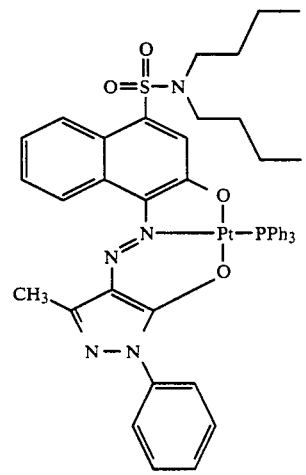

39

What is claimed is:

1. A metal-containing dye having a nucleus of the formula:

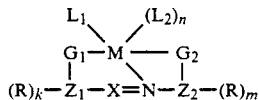

wherein:

$Z_1$ and $Z_2$ each independently represents an arene nucleus having from 5 to 14 ring atoms;

$G_1$ and $G_2$ each independently represent a metal ligating group wherein $G_1$ and $G_2$ may be contained within or pendant from at least one of $Z_1$ and $Z_2$ and are independently selected from the group consisting of; oxygen, hydroxy, alkylthio, carboxy, sulfur, amine, substituted amine, acylamido, sulfonamido, and sulfamoyl;

R represents a hydrogen atom, a halogen atom, an alkyl group, an acylamino group, an alkoxy group, a sulfonamido group, an aryl group, a thiol group, an alkythio group, an arylthio group, an alkylamino group, an arylamino group, an amino group, an alkoxycarbonyl group, an acyloxy group, a nitro group, a cyano group, an alkylsulfonyl, an arylsulfonyl group, an alkylsulfoxyl group, an arylsulfoxyl group, an aryloxy group, a hydroxy group, a thioamido group, a carbamoly group, a sulfamoyl group, a formyl group, an acyl group, a ureido group, an aryloxycarbonyl group, a silyl group, or a sulfoalkoxy group;

$L_1$ represents a trialkyl or triaryl phosphine ligand; or $L_1$ represents a pyridine group free of free-radically polymerizable functionality, and free of substitution at the 2- and 6-positions of the pyridine ring group and at least one of the 3-, 4-, 5-positions of the pyridine ring group is substituted with $R_1$, wherein;

$R_1$ represents an alkyl group, an acylamino group, an alkoxy group, a sulfonamido group, an aryl group, an alkylthio group, an alkylamino group, an alkoxycarbonyl group, an acyloxy group, an alkylsulfonyl group, an alkylsulfoxyl group, an alkylcarbamoxyl group, an alkylsulfamoyl group, a formyl group, an acyl group, a silyl group, or a sulfoalkoxy group;

$L_2$ represents a non-free-radically polymerizable monodentate or polydentate ligand;

X represents nitrogen;

M is a divalent or polyvalent transition metal ion where the coordination number is at least 4; and k, m, and n are whole numbers less than or equal to 3.

2. The metal-containing dye according to claim 1 wherein $L_1$ is pyridine wherein the 2- and the 6-positions of the pyridine ring group contain hydrogen substituents and at least one of the 3-position, 4-position, or 5-position of the pyridine ring are substituted with an alkyl group, an ester group, an alkanoyl group, an alkylsulfonyl group, or an alkoxy group.

3. The metal-containing dye according to claim 1 wherein R does not contain $-SO_3^{31}$; $-SO_3H$; $-CO_2^-$, or $-CO_2H$.

4. The metal-containing dye according to claim 1 wherein $G_1$ and $G_2$ independently represent hydroxy, oxygen, carboxy, or a nitrogen atom.

5. The metal-containing dye according to claim 1 wherein M is a Group 6 or 10 metal ion.

6. The metal-containing dye according to claim 1 wherein M is selected from the group consisting of: chromium(III), nickel(II), palladium(II), and platinum(II).

7. The metal-containing dye according to claim 1 wherein R is an alkyl or dialkylsulfonamido group.

8. The metal-containing dye according to claim 1 wherein $R_1$ is an alkyl group having at least 3 carbon atoms.

9. The metal-containing dye according to claim 1 wherein $L_2$ is a $\beta$-diketonate and M is a Group 6 metal.

10. The metal-containing dye according to claim 1 wherein $L_1$ is a triarylphosphine or a trialkylphosphine.

11. The metal-containing dye according to claim 1 wherein both $G_1$ and $G_2$ are oxygen; M is copper, nickel, platinum, palladium, or chromium; and $L_1$ is a substituted pyridine.

* * * * *